(12) United States Patent
Shakkarwar

(10) Patent No.: US 11,080,678 B2
(45) Date of Patent: *Aug. 3, 2021

(54) PAYMENT PROCESSING PLATFORM

(75) Inventor: Rajesh G. Shakkarwar, Saratoga, CA (US)

(73) Assignee: VERIENT, INC., San Jose, CA (US)

( * ) Notice: Subject to any disclaimer, the term of this patent is extended or adjusted under 35 U.S.C. 154(b) by 1221 days.

This patent is subject to a terminal disclaimer.

(21) Appl. No.: 12/118,646

(22) Filed: May 9, 2008

(65) Prior Publication Data

US 2009/0281945 A1 Nov. 12, 2009

(51) Int. Cl.
*G06Q 30/00* (2012.01)
*G06Q 20/22* (2012.01)
*G06Q 20/10* (2012.01)
*G06Q 20/24* (2012.01)
*G06Q 20/40* (2012.01)

(52) U.S. Cl.
CPC ....... *G06Q 20/2295* (2020.05); *G06Q 20/102* (2013.01); *G06Q 20/24* (2013.01); *G06Q 20/405* (2013.01)

(58) Field of Classification Search
CPC ...................................................... G07F 19/00
USPC ... 705/40, 1, 1.1, 38, 37, 41, 36, 44, 34, 35, 705/36 R; 235/380, 379
See application file for complete search history.

(56) References Cited

U.S. PATENT DOCUMENTS

| 5,884,271 | A | 3/1999 | Pitroda et al. |
| 5,953,710 | A | 9/1999 | Fleming |
| 6,101,486 | A | 8/2000 | Roberts et al. |
| 6,311,194 | B1 | 10/2001 | Sheth et al. |
| 6,973,625 | B1 | 12/2005 | Lupo et al. |
| 6,973,627 | B1 | 12/2005 | Appling |
| 6,993,712 | B2 | 1/2006 | Ramachandran et al. |

(Continued)

FOREIGN PATENT DOCUMENTS

| EP | 1 383 073 | * | 1/2004 |
| EP | 1 383 079 A2 | | 1/2004 |

(Continued)

OTHER PUBLICATIONS

NPL Search History.*

(Continued)

*Primary Examiner* — John H. Holly
(74) *Attorney, Agent, or Firm* — Artegis Law Group, LLP

(57) ABSTRACT

A method for processing a child transaction involving a child product that is linked to a core account and is to be used for payment transactions within use restrictions defined by one or more control parameters. A payment processing platform receives one or more attributes defining the child transaction that is initiated at a merchant entity and compares the one or more attributes to the one or more control parameters. A child card number associated with the child transaction is determined, and a core account number, which is associated with the core account based on the child card number, is identified. Advantageously, the financial institution does not need to modify its legacy payment processing infrastructure in order to process payment transactions made using the child product. Additionally, child products protect consumers from fraud or identity theft and limit a customer's exposure when child products are lost or stolen.

22 Claims, 18 Drawing Sheets

(56) References Cited

U.S. PATENT DOCUMENTS

| | | |
|---|---|---|
| 7,177,836 B1 | 2/2007 | German et al. |
| 7,225,156 B2 | 5/2007 | Fisher et al. |
| 7,284,126 B2 | 10/2007 | Engel |
| 7,546,945 B1 | 6/2009 | Bucci et al. |
| 7,548,890 B2 | 6/2009 | Shakkarwar |
| 7,567,934 B2 | 7/2009 | Flitcroft et al. |
| 7,571,142 B1 | 8/2009 | Flitcroft et al. |
| 7,593,896 B1 | 9/2009 | Flitcroft et al. |
| 7,640,512 B1 | 12/2009 | Appling |
| 7,665,657 B2* | 2/2010 | Huh .................. G06Q 20/108 235/379 |
| 7,761,370 B1 | 7/2010 | Hicks et al. |
| 7,769,688 B1 | 8/2010 | Bent et al. |
| 7,881,999 B2 | 2/2011 | Bagheri |
| 7,882,203 B2 | 2/2011 | Sasnett et al. |
| 7,904,385 B2 | 3/2011 | Bishop et al. |
| 7,912,917 B2 | 3/2011 | Chakra et al. |
| 7,941,367 B2 | 5/2011 | Bishop et al. |
| 7,941,372 B2 | 5/2011 | Bishop et al. |
| 7,953,671 B2 | 5/2011 | Bishop et al. |
| 7,962,408 B2 | 6/2011 | Bishop et al. |
| 7,983,987 B2 | 7/2011 | Kranzley et al. |
| 8,019,664 B1 | 9/2011 | Tifford et al. |
| 8,020,763 B1 | 9/2011 | Kowalchyk et al. |
| 8,024,267 B2 | 9/2011 | Olliphant et al. |
| 8,028,041 B2 | 9/2011 | Olliphant et al. |
| 8,032,456 B1 | 10/2011 | Bent et al. |
| 8,065,610 B2 | 11/2011 | Xu et al. |
| 8,073,895 B2 | 12/2011 | Hamzeh et al. |
| 8,121,941 B2 | 2/2012 | Matthews et al. |
| 8,260,705 B1 | 9/2012 | Bent et al. |
| 8,311,939 B1 | 11/2012 | Bent et al. |
| 8,417,601 B1 | 4/2013 | Simons |
| 8,606,702 B2 | 12/2013 | Ruckart |
| 8,676,708 B1 | 3/2014 | Honey |
| 8,688,577 B1 | 4/2014 | Bent et al. |
| 8,689,012 B1 | 4/2014 | Bierbaum et al. |
| 8,751,376 B1 | 6/2014 | Wilkes |
| 8,781,931 B1 | 7/2014 | Bent et al. |
| 8,793,164 B2 | 7/2014 | Sendo et al. |
| 8,881,975 B1 | 11/2014 | Matthews |
| 9,424,603 B2 | 8/2016 | Hammad et al. |
| 2001/0001856 A1 | 5/2001 | Gould et al. |
| 2001/0034720 A1 | 10/2001 | Armes |
| 2002/0022966 A1 | 2/2002 | Horgan |
| 2002/0055907 A1 | 5/2002 | Pater et al. |
| 2002/0077978 A1 | 6/2002 | O'Leary et al. |
| 2002/0087427 A1 | 7/2002 | Ganesan et al. |
| 2002/0087469 A1 | 7/2002 | Ganesan et al. |
| 2002/0095386 A1* | 7/2002 | Maritzen ............ G06Q 20/3572 705/64 |
| 2002/0111886 A1 | 8/2002 | Chenevich et al. |
| 2002/0198806 A1* | 12/2002 | Blagg .................... G06Q 40/02 705/35 |
| 2003/0191711 A1 | 10/2003 | Jamison et al. |
| 2004/0039694 A1 | 2/2004 | Dunn et al. |
| 2004/0139004 A1 | 7/2004 | Cohen |
| 2004/0158522 A1 | 8/2004 | Brown et al. |
| 2004/0205593 A1 | 10/2004 | Kraemer |
| 2004/0230495 A1 | 11/2004 | Lotvin et al. |
| 2005/0004909 A1 | 1/2005 | Stevenson et al. |
| 2005/0021399 A1 | 1/2005 | Postrel |
| 2005/0033609 A1 | 2/2005 | Yang |
| 2005/0102188 A1 | 5/2005 | Hutchison et al. |
| 2005/0103836 A1 | 5/2005 | Tolley |
| 2005/0132202 A1 | 6/2005 | Dillaway et al. |
| 2005/0216354 A1 | 9/2005 | Bam et al. |
| 2005/0240522 A1 | 10/2005 | Kranzley et al. |
| 2005/0256747 A1 | 11/2005 | Hellrigel |
| 2005/0289057 A1 | 12/2005 | Onizuka |
| 2006/0064320 A1 | 3/2006 | Postrel |
| 2006/0076400 A1* | 4/2006 | Fletcher ................ G07F 7/10 235/379 |
| 2006/0165060 A1 | 7/2006 | Dua |
| 2006/0168096 A1 | 7/2006 | Hayward et al. |
| 2006/0229959 A1 | 10/2006 | Heidingsfeld et al. |
| 2007/0017976 A1 | 1/2007 | Peyret et al. |
| 2007/0083464 A1 | 4/2007 | Cordero Torres et al. |
| 2007/0192245 A1 | 8/2007 | Fisher et al. |
| 2007/0255653 A1 | 11/2007 | Tumminaro et al. |
| 2007/0282739 A1 | 12/2007 | Thomsen |
| 2008/0021787 A1 | 1/2008 | Mackouse |
| 2008/0086424 A1 | 4/2008 | Jambunathan et al. |
| 2008/0120195 A1 | 5/2008 | Shakkarwar |
| 2008/0120210 A1 | 5/2008 | Leventhal |
| 2008/0249931 A1 | 10/2008 | Gilder et al. |
| 2008/0288404 A1 | 11/2008 | Pirzadeh et al. |
| 2009/0070260 A1 | 3/2009 | Flitcroft et al. |
| 2009/0076966 A1 | 3/2009 | Bishop et al. |
| 2009/0131025 A1 | 5/2009 | Sharma et al. |
| 2009/0132266 A1* | 5/2009 | Kao .................. G06Q 10/067 705/348 |
| 2009/0150288 A1 | 6/2009 | Bishop et al. |
| 2009/0228370 A1 | 9/2009 | Shakkarwar |
| 2009/0234751 A1 | 9/2009 | Chan et al. |
| 2009/0281944 A1 | 11/2009 | Shakkarwar |
| 2010/0010909 A1 | 1/2010 | Marshall et al. |
| 2010/0036761 A1 | 2/2010 | Gelerman |
| 2010/0037303 A1 | 2/2010 | Sharif et al. |
| 2010/0063906 A1 | 3/2010 | Nelsen et al. |
| 2010/0153224 A1 | 6/2010 | Livnat |
| 2010/0211445 A1 | 8/2010 | Bodington |
| 2010/0241518 A1 | 9/2010 | Mccann |
| 2010/0251143 A1 | 9/2010 | Thomas et al. |
| 2010/0268588 A1 | 10/2010 | Lal et al. |
| 2010/0280956 A1 | 11/2010 | Chutorash et al. |
| 2011/0010237 A1 | 1/2011 | Shakkarwar |
| 2011/0106674 A1 | 5/2011 | Perlman |
| 2011/0106696 A1 | 5/2011 | Seven |
| 2011/0246374 A1 | 10/2011 | Franz |
| 2012/0047065 A1 | 2/2012 | Neff |
| 2012/0066096 A1 | 3/2012 | Penide |
| 2012/0253852 A1 | 10/2012 | Pourfallah et al. |
| 2013/0080323 A1 | 3/2013 | Scipioni |
| 2013/0103560 A1 | 4/2013 | Stone et al. |
| 2013/0275305 A1 | 10/2013 | Duplan |
| 2013/0346305 A1 | 12/2013 | Mendes |
| 2014/0278989 A1 | 9/2014 | Calman et al. |
| 2014/0279008 A1 | 9/2014 | Calman et al. |
| 2014/0324627 A1 | 10/2014 | Haver et al. |
| 2015/0058109 A1 | 2/2015 | Lange |
| 2015/0278811 A1 | 10/2015 | Lalchandani et al. |
| 2017/0069028 A1 | 3/2017 | Narayana et al. |

FOREIGN PATENT DOCUMENTS

| | | |
|---|---|---|
| EP | 2 355 033 A1 | 8/2011 |
| WO | 01/03033 A1 | 1/2001 |
| WO | WO 2005/017793 | 2/2005 |
| WO | WO 2007/011791 | 1/2007 |
| WO | 2009/137716 A2 | 11/2009 |

OTHER PUBLICATIONS

ProQuest Search History.*
PCT Search Report, PCT/US 09/43161, dated Nov. 9, 2009.
PCT Search Report, PCT/US09/43200, dated Jun. 16, 2009.
PCT Search Report, PCT Appl. No. PCT/US2010/049985, dated Nov. 17, 2010.
Final Office Action, U.S. Appl. No. 12/118,643, dated Sep. 23, 2010.
EP Search Report for Application No. 09743702.4-1238 / 2300972 PCT/US2009043200 dated Apr. 20, 2012.
Office Action, U.S. Appl. No. 12/118,647, dated Oct. 6, 2011.
European Search Report dated May 6, 2014 in Application No. 10 81 9452.
Non-Final Rejection received for U.S. Appl. No. 15/960,223, dated Mar. 5, 2020, 40 pages.
Non-Final Rejection received for U.S. Appl. No. 13/011,536, dated Mar. 3, 2020, 18 pages.
Notice of Allowance received for U.S. Appl. No. 13/011,525, dated Mar. 12, 2020, 39 pages.

(56) References Cited

OTHER PUBLICATIONS

Notice of Allowance received for U.S. Appl. No. 15/681,298 dated Apr. 1, 2020, 16 pages.

Levitin, Adam J., "Payment Wars: The Merchant-Bank Struggle for Control of Payment Systems", Stanford Journal of Law, Business & Finance, vol. 12, No. 2, ProQuest Central, Spring, 2007, pp. 425-485.

Non-Final Rejection received for U.S. Appl. No. 12/118,647, dated Jun. 18, 2010, 35 pages.

Final Rejection received for U.S. Appl. No. 12/118,647, dated Dec. 7, 2010, 29 pages.

Final Rejection received for U.S. Appl. No. 12/118,647, dated Mar. 9, 2012, 30 pages.

Non-Final Rejection received for U.S. Appl. No. 12/118,647, dated May 7, 2013, 38 pages.

Final Rejection received for U.S. Appl. No. 12/118,647, dated Dec. 27, 2013, 38 pages.

Non-Final Rejection received for U.S. Appl. No. 12/887,347, dated Apr. 1, 2011, 27 pages.

Final Rejection received for U.S. Appl. No. 12/887,347, dated Sep. 26, 2011, 23 pages.

Non-Final Rejection received for U.S. Appl. No. 12/887,347, dated Mar. 14, 2012, 28 pages.

Final Rejection received for U.S. Appl. No. 12/887,347, dated Aug. 31, 2012, 27 pages.

Non-Final Rejection received for U.S. Appl. No. 12/887,347, dated Aug. 29, 2016, 25 pages.

Final Rejection received for U.S. Appl. No. 12/887,347, dated Mar. 30, 2017, 24 pages.

Notice of Allowance received for U.S. Appl. No. 12/887,347, dated Feb. 9, 2018, 32 pages.

Notice of Allowance received for U.S. Appl. No. 15/960,223, dated Jun. 26, 2020, 67 pages.

"California government doles out more IOUs", USA Today, http://usatoday30.usatoday.com/news/nation/2009-07-07-iou_N.htm, Jul. 7, 2009, 3 pages.

Notice of Allowance received for U.S. Appl. No. 15/960,223, dated Oct. 2, 2020, 109 pages.

* cited by examiner

GIFT CARD

Retail Bank | History | Close | Logout | Help

Account To Pay From [ ▼ ]
Amount [ ]
Name On Card [ ]
Expiration Date [ ] 🗓
Ship To ● Purchaser
○ Recipient
Address [ ]
State [ ▼ ] ⎫
Zip [ ] ⎬ 1108
Send to Email ☐ ⎭
Email Address [ ]
Parental Control ☐

1102 → Send to Email
1104 → Email Address
1106 → Parental Control

[ Back ]   [ Next ]

PAYMENT PROCESSING PLATFORM

BACKGROUND OF THE INVENTION

Field of the Invention

The present invention relates generally to the field of payment processing and, more particularly, to a payment processing platform.

Description of the Related Art

As is known, several methods of payment for goods or services exist today, including cash, check, credit card, and debit card. Some of the most popular methods of payment include payment by credit card and by debit card. When credit/debit cards were first introduced, there was no concept of online payments, online banking, or payments via mobile phone. Today, these forms of payment are also very common.

As is known, a credit/debit card system is one where an issuer, usually a financial institution, issues a credit/debit card to a customer. The customer may then pay for goods or services using the credit/debit card. Essentially, the issuer is lending money to the customer to pay for the good or services.

When payment for goods or services is initiated with a credit/debit card, the transaction details are sent to a card network for processing. Each credit/debit card has a unique prefix that allows for proper routing of the transaction to the proper card network and to the proper financial institution. When the transaction is received by the financial institution, the transaction is processed and either approved or denied based on well-defined criteria.

However, existing payment products, including credit/debit cards, are based on legacy systems of financial institutions that are hard to change. Many financial institution systems use older generation software and mainframe computers. The rigidity of the legacy systems and infrastructure, along with the large amount of information technology resources that get spent on compliance and maintenance, do not allow financial institutions to keep pace with current payment technologies and customer demands.

For these reasons, other non-financial institution based companies have stepped in to fill the void. Payment processing services, like Paypal®, have been introduced to meet the market needs unmet by the financial institutions. However, these prior art payment processing services pose a problem for financial institutions in that these services disintermediate customers from the financial institutions and take away revenue from the financial institutions.

Accordingly, there exists a need in the art for a payment processing platform that allows financial institutions to offer more sophisticated payment processing methods with minimal changes to their legacy systems.

SUMMARY OF THE INVENTION

Embodiments of the present invention provide a method for generating a child product that is linked to a core account. A payment processing platform receives a user selection of control parameters that define use restrictions for the child product. The payment processing platform also receives a user selection of the core account that provides financial backing for the child product. The child product is generated and may be used for payment transactions within the use restrictions defined by the control parameters. The child product is delivered to a recipient as a physical card or as a virtual card (non-physical manifestation) or both as a physical card and a virtual card and may be used to make payment transactions.

Additional embodiments of the present invention provide a method for processing a child transaction involving a child product that is linked to a core account and is to be used for payment transactions within use restrictions defined by one or more control parameters. A payment processing platform receives one or more attributes defining the child transaction that is initiated at a merchant entity and compares the one or more attributes to the one or more control parameters. A child card number associated with the child transaction is determined, and a core account number, which is associated with the core account based on the child card number, is identified.

Advantageously, the financial institution needs to modify its legacy payment processing infrastructure minimally in order to process payment transactions made using the child product. In addition, child products significantly reduce financial institutions' expenses related to fraud or identity theft when child products are lost or stolen. From a user perspective, child products protect consumers from fraud or identity theft, and limit a customer's exposure when child products are lost or stolen.

BRIEF DESCRIPTION OF THE DRAWINGS

So that the manner in which the above recited features of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 11 is a screen shot illustrating selection of control parameters for a gift card child product, according to one embodiment of the invention.

DETAILED DESCRIPTION OF THE INVENTION

Figure 1:
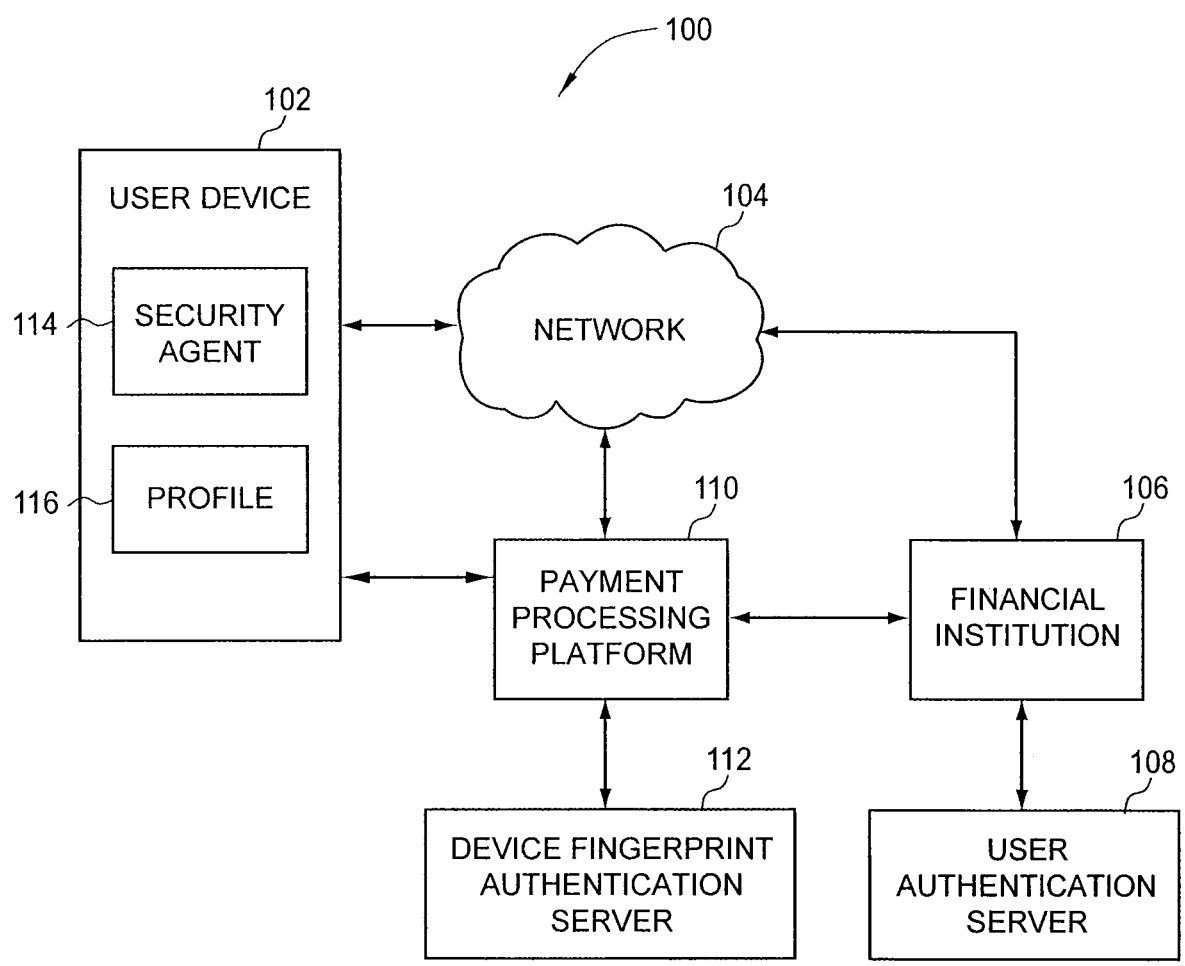
FIG. 1 is a block diagram illustrating components of a system configured to implement one or more aspects of the present invention.

FIG. 1 is a block diagram illustrating components of a system 100 configured to implement one or more aspects of the present invention. As shown, the system 100 includes a user device 102, network 104, financial institution 106, user authentication server 108, payment processing platform 110, and device finger print authentication server 112.

The user device 102 may be any type of individual computing device such as, for example, a desktop computer, a laptop computer, a hand-held mobile device, a personal digital assistant, or the like. Alternatively, the user device 102 may be any other device, such as a standard telephone, or an ATM terminal for a financial institution, or a terminal used by a customer representative at a financial institution, or the like. In one embodiment, the user device 102 is configured to be in communication with the other components in the system 100 via the network 104. The network 104 may be any type of data network, such as a local area network (LAN), a wide area network (WAN), cellular communications network, the Internet, a voice network such as a standard telephone network, or the like.

As is described in greater detail below, a user may generate a "child product" that is linked to a "core account" held with a financial institution. In one embodiment, the core account may be any standard account held with a financial institution 106, including a checking account, savings account, home equity line of credit, money market account, credit card account, healthcare savings account, educational savings account, or the like. The child product may be used to make payment transactions and the payment transactions may be processed as if the payment transactions were made using the core account. For example, a child product that is linked to a credit card core account is processed by the financial institution legacy system in the same manner as a regular credit card transaction. In further embodiments, control parameters may be added to the child product, restricting the usage of the child product, as described in greater detail below.

In one embodiment, when a user wishes to generate the child product, the user may direct the user device 102 to navigate to a webpage of the financial institution 106. In another embodiment, the user may use an ATM terminal at the financial institution to generate the child product. In yet another embodiment, the user may request the generation of a child product through a customer service representative at a branch location of the financial institution 106. In yet another embodiment, the user may request the generation of a child product through a customer service representative at a customer support call center of the financial institution 106.

As described in greater detail below, the user may need to authenticate with the financial institution 106 before the child product is generated. In one embodiment, authentication includes the user being prompted to enter a username and/or password. In alternate embodiments, the user may be prompted to swipe an ATM card and enter a PIN number to authenticate. In yet additional embodiments, the user may be asked to show a driver's license or a government-issued photo identification to authenticate with the financial institution 106. In still further embodiments, the user may place a telephone call to the financial institution customer service phone number to generate a child product. Authentication may involve the user being asked questions to verify the identity of the user. In alternative embodiments, a third-party other than a financial institution, may offer the ability to generate child products. In these embodiments, the user may be authenticated using any of the authentication methods described in relation to authenticating with a financial institution.

In another embodiment, to provide an additional layer of security, the user device 102 may include a security agent 114 and device profile 116. After the user has been authenticated with the financial institution 106, the payment processing platform 110 may prompt the security agent 114 installed on the user device 102 for the device profile 116 of the user device 102. The security agent 114 transmits the device profile 116 to the payment processing platform 110. The received device profile 116 is compared to data stored in the device finger print authentication server 112 that may include a listing of approved/authenticated user devices associated with each user. In one embodiment, each time that a user attempts to authenticate with a different user device 102, a confirmation code is sent to an email address for the user that the user enters before the user device is authenticated. In alternative embodiments, the confirmation code may be sent to the user via a Short Message Service (SMS), a text message, or via any other electronic means including by telephone. Once a particular user device 102 has been confirmed, the device profile 116 of the user device 102 is stored in the database of the device finger print authentication server 112. The next time the user attempts to authenticate using that particular user device 102, the device profile 116 of the user device is recognized by the device finger print authentication server 112 and the user is authenticated. Once the user is properly authenticated, the user may generate the child product.

Figure 2:
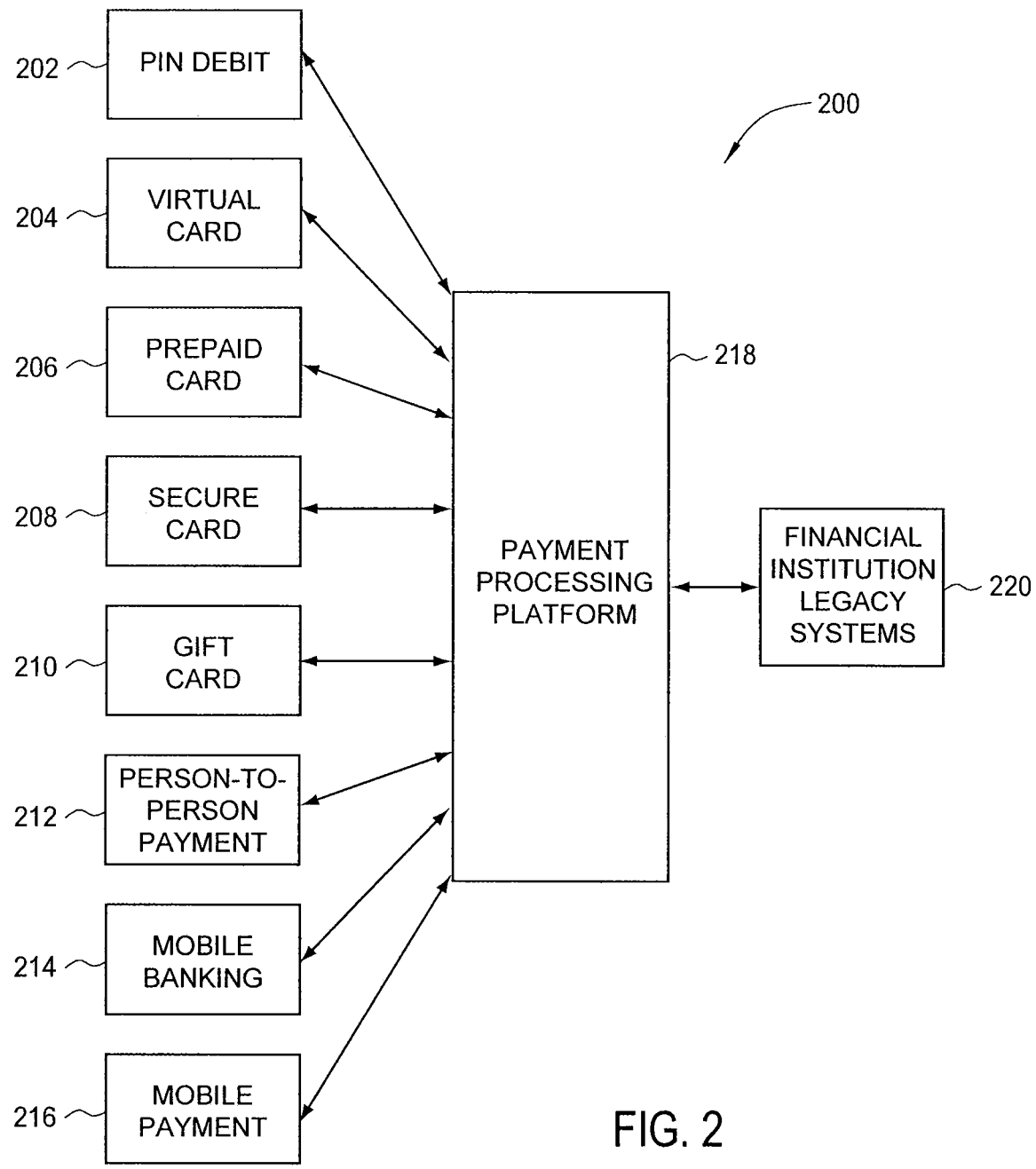
FIG. 2 is a conceptual illustration of a system including a payment processing platform, according to one embodiment of the invention.

FIG. 2 is a conceptual illustration of a system 200 including a payment processing platform 218, according to one embodiment of the invention. As shown, the payment processing platform 218 serves as an intermediary between various child products 202-216 and financial institution legacy systems 220. Child products may include a PIN debit child product 202, virtual card child product 204, prepaid card child product 206, secure card child product 208, gift card child product 210, person-to-person payment child product 212, mobile banking child product 214, or mobile payment child product 216.

As is known, in a debit transaction, a debit card or bank card is used to make a payment. The use of a debit card is functionally similar to writing a check, as the funds are withdrawn directly from the financial institution account of the user. In a conventional PIN-debit card transaction at a physical merchant location, the user may swipe or insert the debit card into a terminal and the transaction is authenticated by entering a personal identification number (PIN). However, PIN-debit transactions are not initiated on the Internet because users are wary of entering their PIN number into a browser webpage for security reasons.

The PIN debit child product 202 allows for PIN debit transactions on the Internet. From a payment page of an online merchant, a user may select a "Pay From My Financial Institution" payment option. At this point, the user is authenticated through the financial institution's user authentication server 108, as described above in FIG. 1. A virtual debit card number and a virtual PIN may be generated that are linked to the user's account held at the financial institution. The user is able to initiate the online transaction as if the transaction was being made using a normal debit card. In this way, because the user has already been authenticated with the financial institution through the financial institution's authentication server 108, the virtual PIN serves the same purpose as a real PIN from the merchant's perspective. In this way, the core account transaction is processed as a PIN debit transaction at the financial institution. In another embodiment, the payment processing platform receives a trigger from a merchant. In response, the payment processing platform transmits a listing of financial institutions offering the ability to generate child products to the merchant. A user selects a financial institution from the listing and the user is authenticated through the financial institution's user authentication server 108, as described above in FIG. 1

A virtual card child product 204 is a payment method for which non physical manifestation of child card is generated. A user may create a virtual card child product 204 as a virtual credit or debit card, having a seemingly "normal" credit/debit card number, which can be used for card-not-present transactions such as online transaction, or mail-order telephone orders (MOTO) transactions. In alternative embodiments, a virtual card child product 204 may be generated and the card number may be associated with the contactless payment options enabled by a mobile device such as a radio-frequency identification (RFID) tag of a mobile device to allow a user to make contactless payments at a point-of-sale location. In further embodiments, a virtual card child product 204 may be generated and the user may print-out an image of the virtual card child product, optionally including other identifying information such as a bar code, and take the print-out to a merchant location as a form of payment.

The prepaid card child product 206 may be generated with a pre-loaded balance. A user may load the prepaid card child product 206 with a limit that cannot be exceeded. Additional control parameters may limit a per-transaction limit, or impose further restrictions, as described below. The prepaid card child product 206 may be a physical card, a virtual card, or both a physical card and a virtual card.

A secure card child product 208 is a payment method where child product is generated that is linked to a core account. In one embodiment, transaction made using the secure card child product 208 may be processed similar to transactions made using the core account. Additional control parameters may limit a per-transaction limit, or impose further restrictions, as described below. The secure card child product 208 may be a physical card, a virtual card, or both a physical card and a virtual card.

The gift card child product 210 is a payment method that may be given to another as a gift. The gift card child product 210 may be a physical card, a virtual card, or both a physical card and a virtual card. A gift card child product 210 is different from a prepaid card child product 206 because no funds are withdrawn/charged to the core account when a gift card child product 210 is generated. A gift card child product 210 may still include a limit; however, funds are only withdrawn/charges to the core account when transactions are initiated with the gift card child product 210. In other words, a portion of credit available in the core account is allocated for use by a recipient of the gift card child product 210. This differs from the prepaid card child product 206 which is generated with a pre-loaded balance.

The person-to-person payment child product 212 may be generated and used as a form of payment from one person/entity to another as a form of payment. In one embodiment, the person-to-person payment child product 212, like other child products, may be used to pay for goods or services in merchant transactions. In alternative embodiments, the person-to-person payment child product 212 may be converted to cash. The conversion may be a dollar-for-dollar conversion based on the card limits of the person-to-person payment child product 212, or may be some other ratio.

Mobile banking child products 214 and mobile payment child products 216 may be generated using a mobile device. Similarly, transactions made using other child products may be made with a mobile device.

Figure 3A:
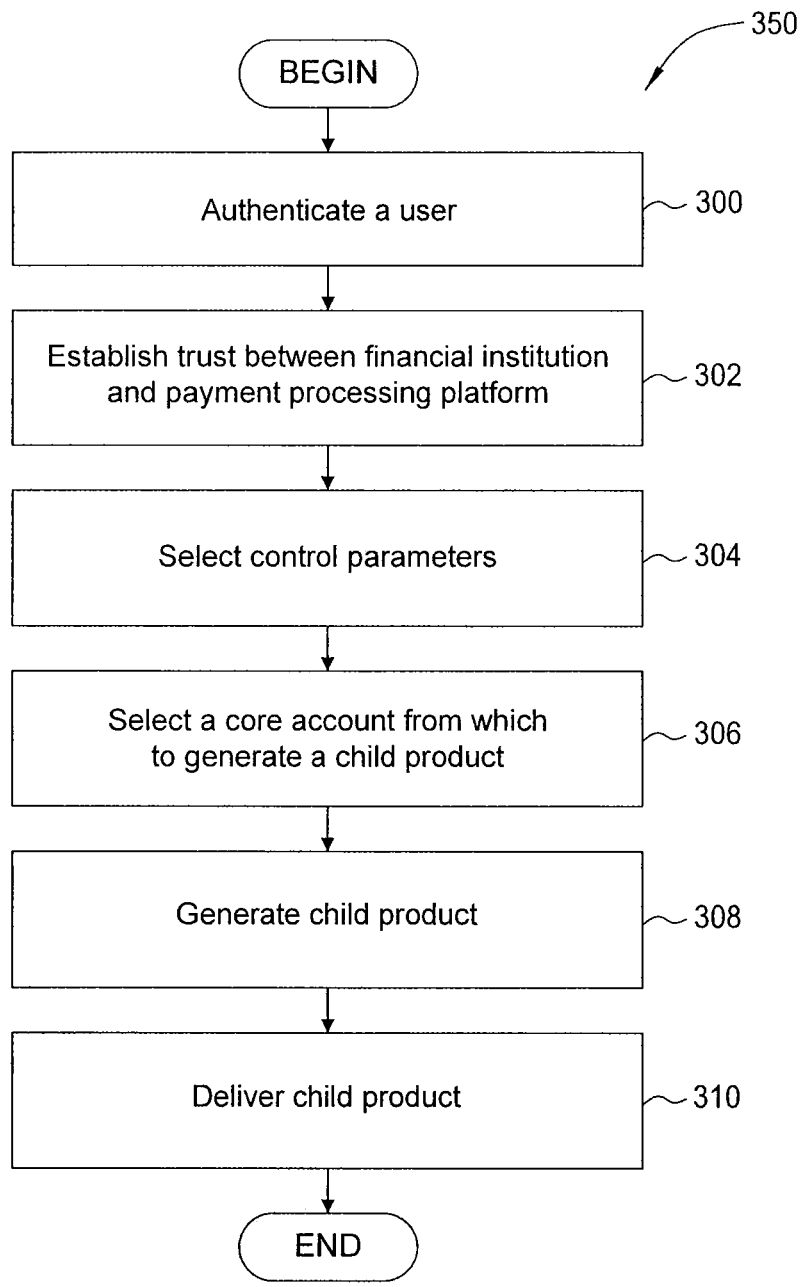
FIG. 3A is a flow diagram of method steps for generating a child product, according to one embodiment of the invention.

FIG. 3A is a flow diagram of method steps for generating a child product, according to one embodiment of the invention. Persons skilled in the art will understand that, even though the method is described in conjunction with the systems of FIGS. 1 and 2, any system configured to perform the steps of the method 350 illustrated in FIG. 3A, in any order, is within the scope of the present invention.

As shown, the method 350 begins at step 300 where a user is authenticated. In one embodiment, the user may be authenticated by entering a username and password into a log-on screen of a financial institution website. In alternative embodiments, a third-party other than a financial institution may offer the ability to generate child products. In these embodiments, the user may be authenticated by entering a username and password into a log-on screen of the third-party website. In yet further embodiments, the device with which the user is attempting to authenticate himself is verified by comparing a device profile for the user device against a database of user devices previously registered by the user, as described in reference to FIG. 1.

In alternate embodiments, the user may be prompted to swipe an ATM card and enter a PIN number to authenticate. In yet additional embodiments, the user may be asked to show a driver's license or a government-issued photo identification to authenticate with the financial institution 106. In still further embodiments, the user may place a telephone call to the financial institution customer service phone number to generate a child product. Authentication may involve the user being asked questions to verify the identity of the user. For example, the user may be asked to verify a social security number and/or mother's maiden name. In yet other embodiments, the user may be authenticated using biometric characteristics.

Figure 4:
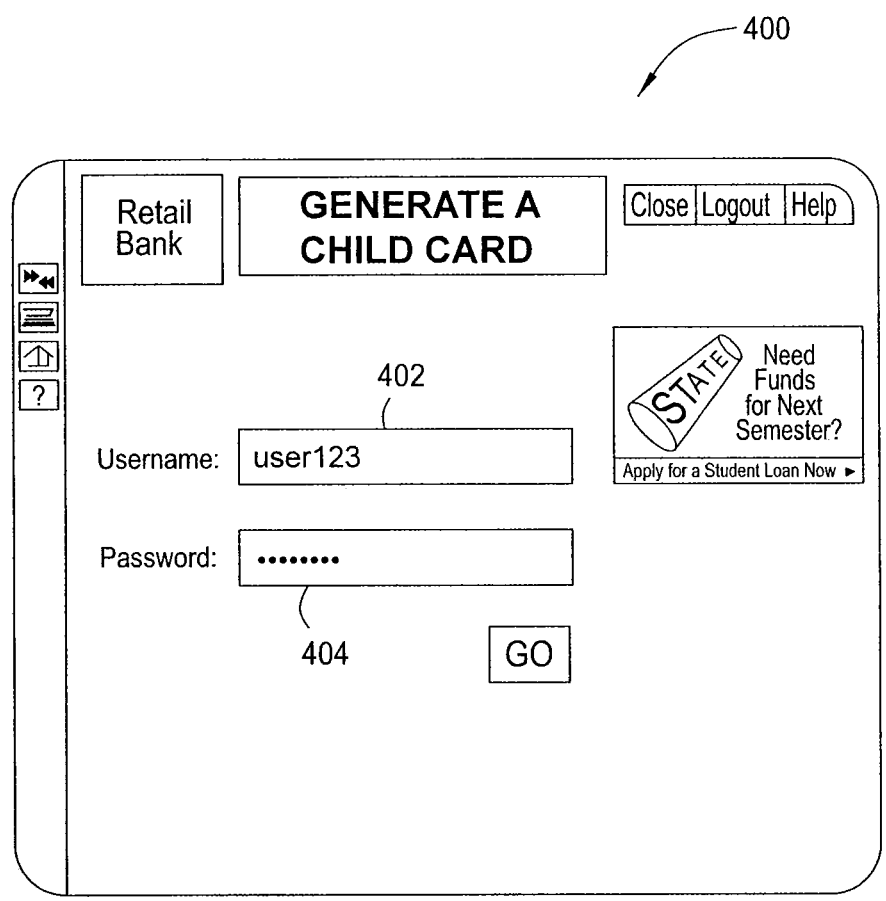
FIG. 4 is a screen shot illustrating an authentication screen, according to one embodiment of the invention.

FIG. 4 is a screen shot 400 illustrating an authentication screen, according to one embodiment of the invention. As shown, the user is prompted to enter a username 402 and password 404 into text fields.

Figure 5:
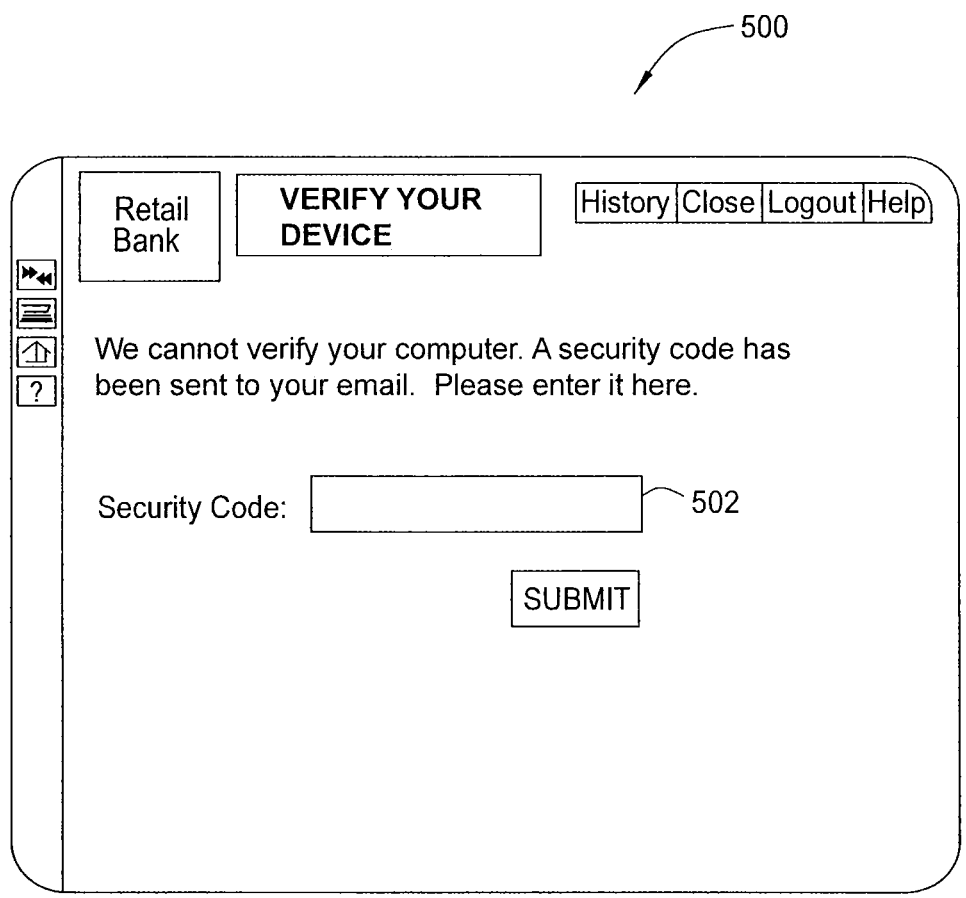
FIG. 5 is a screen shot illustrating a first device finger print authentication screen, according to one embodiment of the invention.

FIG. 5 is a screen shot 500 illustrating a first device fingerprint authentication screen, according to one embodiment of the invention. In one embodiment, a device profile is compared against device profiles stored in a device fingerprint authentication server of user devices previously authenticated by the user. As shown, the user is prompted to enter a security code 502 that has been sent to the user's email address. In another embodiment the security code may be sent as an SMS message to a user's mobile device or by any other electronic means.

Figure 6:
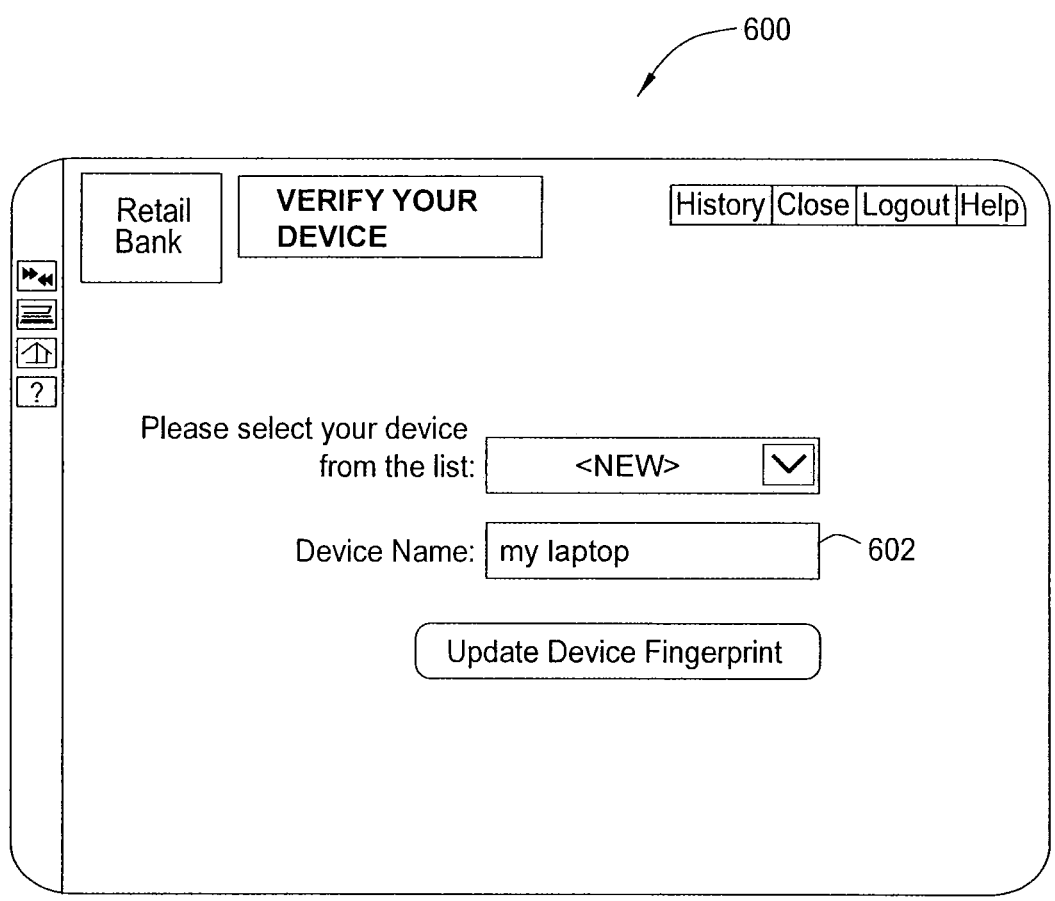
FIG. 6 is a screen shot illustrating a second device finger print authentication screen, according to one embodiment of the invention.

FIG. 6 is a screen shot 600 illustrating a second device fingerprint authentication screen, according to one embodiment of the invention. Once the user has entered a correct security code 502, the user may register the device by inputting a device name 602. Each subsequent time that the user attempts authentication using this particular user device, the device profile of the user device is already registered and the user is authenticated. As shown, the confirmation code was sent to the user's email address. As described above, the confirmation code may be sent via text message, SMS message, or via any other electronic means.

Referring back to FIG. 3A, once the user is properly authenticated, the method 350 proceeds to step 302 where a trust is established between the financial institution 106 and the payment processing platform 110. In another embodiment, at step 302, a trust is established between a third party, other than a financial institution, that may be responsible for authentication and the payment processing platform 110. One embodiment of Step 302 is described in greater detail in FIG. 3B.

Figure 3B:
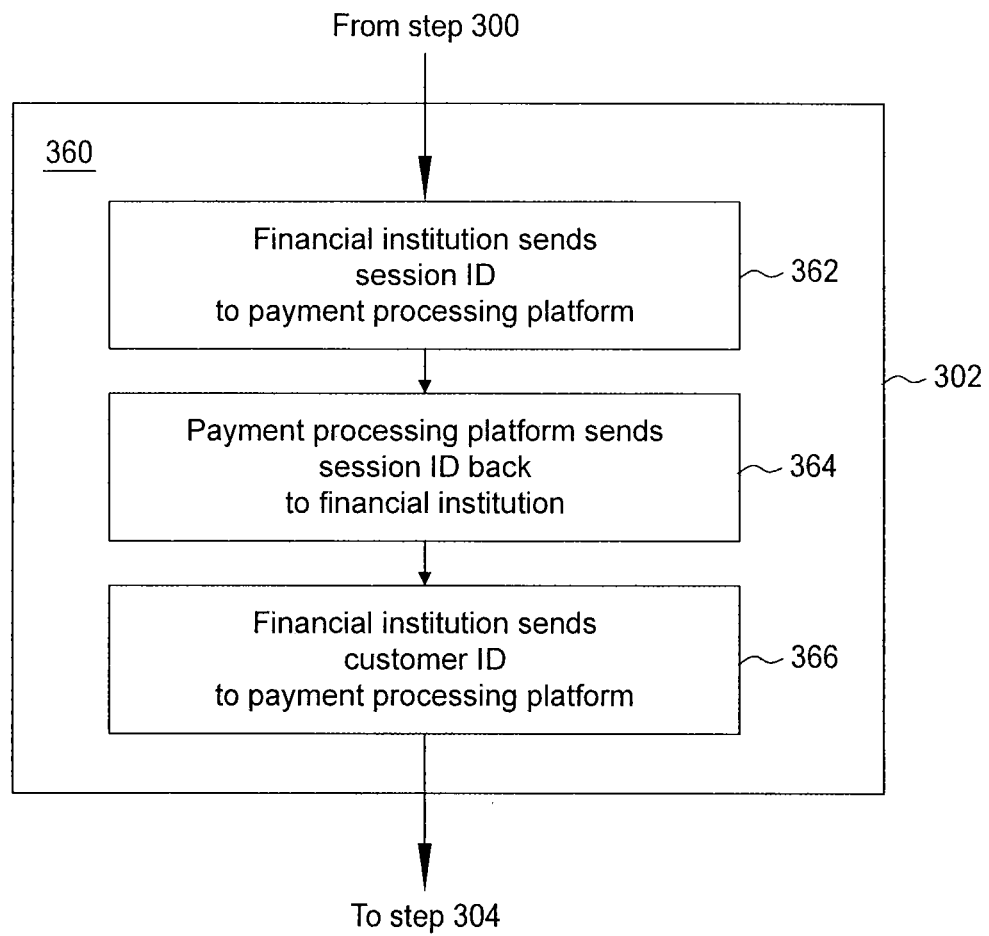
FIG. 3B is flow diagram of method steps for establishing trust between a financial institution and a payment processing platform, according to one embodiment of the invention.

FIG. 3B is flow diagram of method steps for establishing trust between a financial institution 106 and a payment processing platform 110, according to one embodiment of the invention. Persons skilled in the art will understand that, even though the method is described in conjunction with the systems of FIGS. 1 and 2, any system configured to perform the steps of the method 360 illustrated in FIG. 3B, in any order, is within the scope of the present invention.

As shown, the method 360 begins at step 362 where the financial institution 106 sends a session identifier (session ID) to the payment processing platform 110 to begin the trust establishment process. Next, at step 364, the payment processing platform 110 sends the session ID back to the financial institution 106 through a back door to verify that the financial institution 106 had indeed sent that session ID, rather than a hacker, for instance. It should be noted that the exchange of the session ID is not the only means of establishing trust between the systems 106, 110; rather, trust may be established by any means known in the art without departing from the principles of the present invention. Then, at step 366, the financial institution 106 sends a customer identifier (customer ID) to the payment processing platform 110. In one embodiment, within the servers of the payment processing platform 110, the customer ID may be used to translate from a child product card number to a "real" account number, as described in greater detail below.

Referring back to FIG. 3A, at step 304, control parameters are selected. In one embodiment, control parameters include a series of restrictions on transactions made with the child product. For example, the control parameters may include, but are not limited to, one time use card, reusable card, card spending limit, per transaction spending limit, limit on number of transactions in a given period of time, name on card, activation date, expiration date, country of use, merchant of use, merchant category, time of day, day of week, date of month, merchant channel (online, point-of-sale), reset frequency for reset-able cards, and the like. For example, the period of time may be a single month.

When a child product is attempted to be used in a transaction, the transaction details may be checked against the control parameters stored for the child product. In one embodiment, if at least one of the control parameters is not satisfied, then the transaction is rejected. If each of the control parameters match those stored for the child product, the transaction is processed as described in greater detail below in FIGS. 15 and 16. In alternative embodiments, if a minimum number of control parameters are satisfied, then the transaction is approved. For example, a child product may include five control parameters and a transaction is approved if four out of five control parameters are satisfied. In still further embodiments, control parameters may be assigned "weights" such that a transaction is approved if the sum of the weights assigned to the satisfied control parameters exceeds a minimum value. For example, a per transaction limit control parameter may be assigned a weight of five, a merchant category control parameter may be assigned a weight of four, a merchant name parameter may be assigned a weight of three, and all other control parameters may be assigned a weight of two. In this example, a transaction may be approved if the sum of the satisfied control parameters exceeds ten. As will be understood by those having ordinary skill in the art, other techniques for comparing the transaction details against the control parameters stored for the child product to determine a match may be available.

Figure 8:
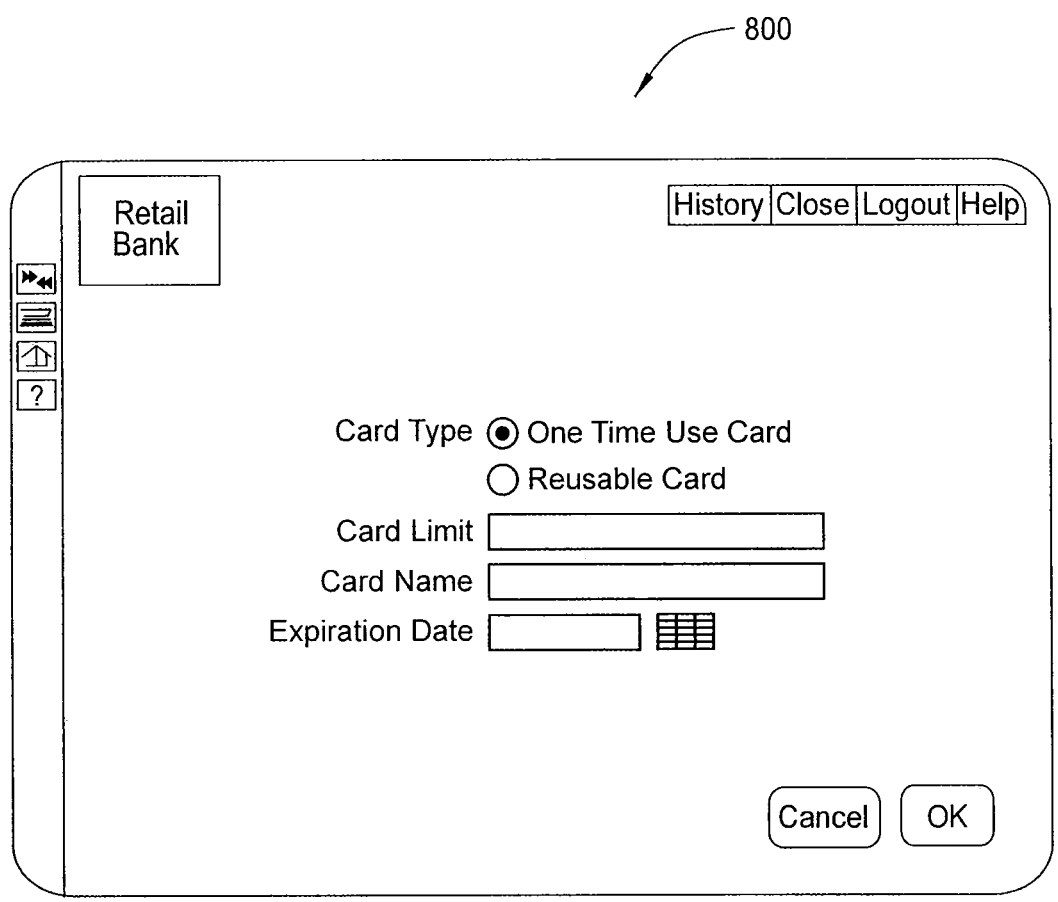
FIG. 8 is a screen shot illustrating selection of control parameters for a one time use child product, according to one embodiment of the invention.

FIG. 8 is a screen shot 800 illustrating selection of control parameters for a one time use child product, according to one embodiment of the invention. As shown, the control parameters include card limit, and expiration date. As one having ordinary skill in the art will appreciate, additional control parameters may be included with a one time use child product. In addition, a financial institution may decide the limit up to which a user can use a child product. For example, the financial institution may limit a one time use child product up to $500, in which case a user can generate a one time use child product having a card limit between $0 and $500. The one time use child product, as its name implies, is a child product that can only be used for a single transaction. After the one time use child product has been used to complete a transaction, the one time use child product is deactivated. For customer convenience, each one time use child product may be given a card name to remind a user of the purpose of the one time use child product. As one having ordinary skill in the art will appreciate, additional control parameters may be included with a one time use card.

Figure 9:
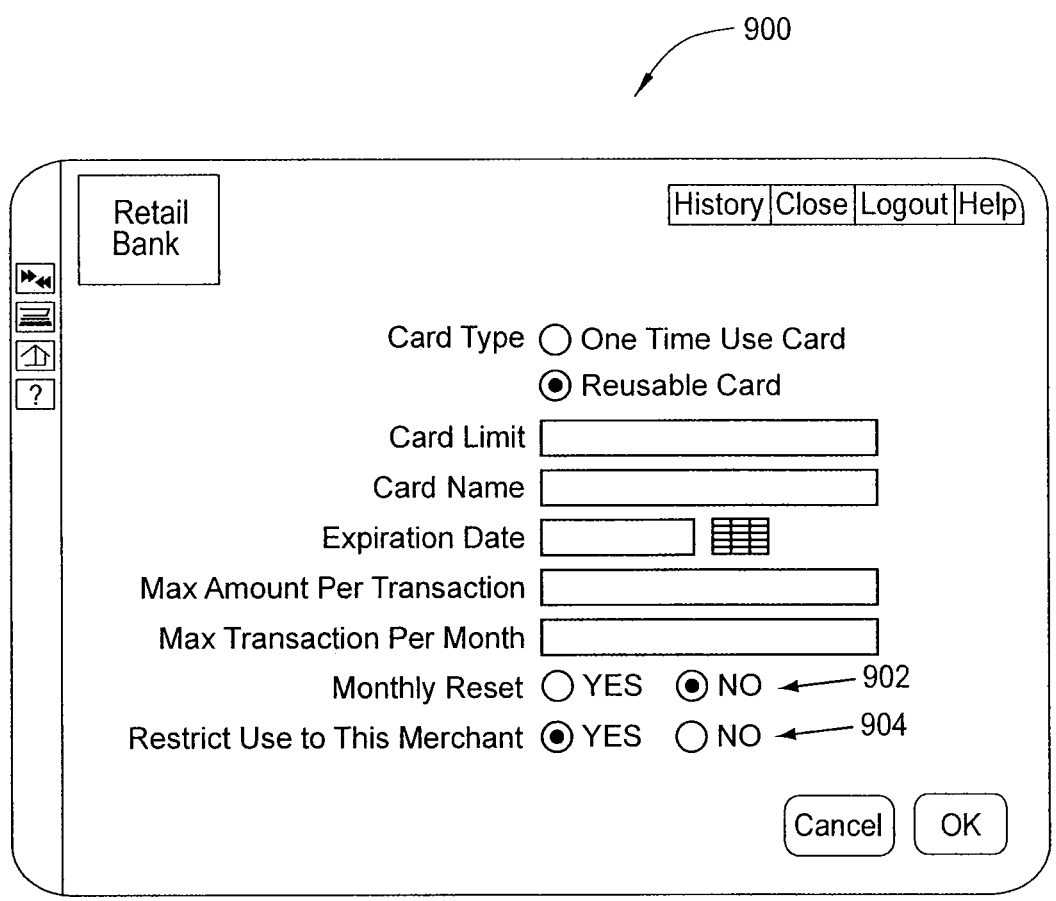
FIG. 9 is a screen shot illustrating selection of control parameters for a reusable child product, according to one embodiment of the invention.

FIG. 9 is a screen shot 900 illustrating selection of control parameters for a reusable child product, according to one embodiment of the invention. As shown, the control parameters include card limit, expiration date, maximum amount per transaction, maximum number of transactions per month, monthly reset, and restrict use to this merchant. As one having ordinary skill in the art will appreciate, additional control parameters may be included with a reusable child product. In addition, a financial institution may decide the limit up to which a user can use a child product and may place restrictions on how far into the future the expiration date may be set. For example, the financial institution may decide to place a limit of the expiration date being no further than three months into the future from the generation date of the child product. Additionally, for customer convenience, each reusable child product may be given a name to remind a user of the purpose of a child product. The reusable child product, as its name implies, is a child product that can be used multiple times.

As shown, the control parameters may optionally include a monthly reset parameter 902. In one embodiment, the monthly reset parameter 902 may be used to initiate recurring transactions, such as paying bills. For example, a user may pay a cell phone bill once a month on the first day of the month. The user may set a monthly reset control parameter 902 that may allow for the transmission of a payment for the user's cell phone bill once each month on the second day of the month. After the payment is transacted, the child product may be deactivated until the following month, at which time the child product may again be used to pay the user's cell phone bill. Similarly, a control parameter may restrict use to a particular merchant 904. In one embodiment, any transactions initiated with other merchants are denied.

Figure 10:
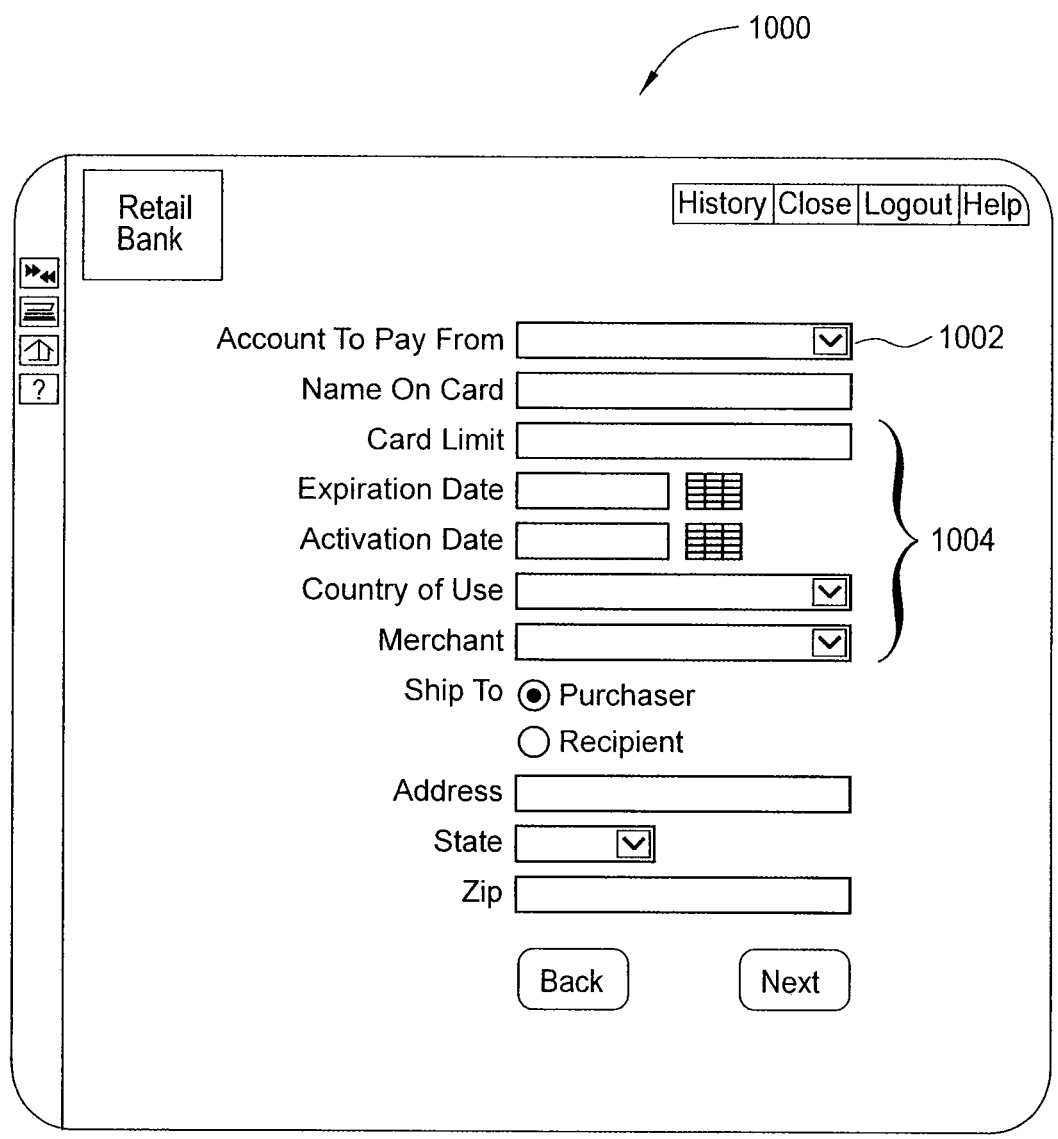
FIG. 10 is a screen shot illustrating selection of control parameters for a child product, according to one embodiment of the invention.

FIG. 10 is a screen shot 1000 illustrating selection of control parameters 1004 for a child product, according to one embodiment of the invention. In one embodiment, the selection of the core account 1002 may be included in a single screen with the selection of the control parameters 1004. As shown, the control parameters include card limit, expiration date, activation date, country of use, and merchant of use. As one having ordinary skill in the art will appreciate, additional control parameters may be selected for the child product, including merchant category (e.g., "restaurants"). For customer convenience each child card may be given a name to remind a user of the purpose of a child card.

FIG. 11 is a screen shot illustrating selection of control parameters for a gift card child product, according to one embodiment of the invention. As shown, many of the control parameters for a gift card child product may be the same as previously described for other child products. In one embodiment, the child product may be sent to the purchaser. In alternative embodiments, the gift card child product is sent to a recipient. In either case, the gift card child product may be delivered as a physical card to a specified address 1108, or may be sent via email by selection of a "Send to Email" option 1102, or both. An email address 1104 may be input to which the generated child product is sent as a "virtual" child product. As one having ordinary skill in the art will appreciate, the generated child product may be sent to the recipient by any other electronic communication means such as SMS message or any other communication means, such as a providing the number verbally via telephone. In another embodiment, a parental control option 1106 may be enabled.

If the parental control option 1106 is enabled, the purchaser of the child product is able to view the details of the transactions made using the child product, even if the child product is used by someone else. For example, a user may generate a child product to give to the user's daughter so that the daughter may purchase textbooks for college. By enabling the parental control option, the user may view the transaction details for any transactions made with the child product to determine if the child product is actually being used to purchase textbooks.

Figure 12:
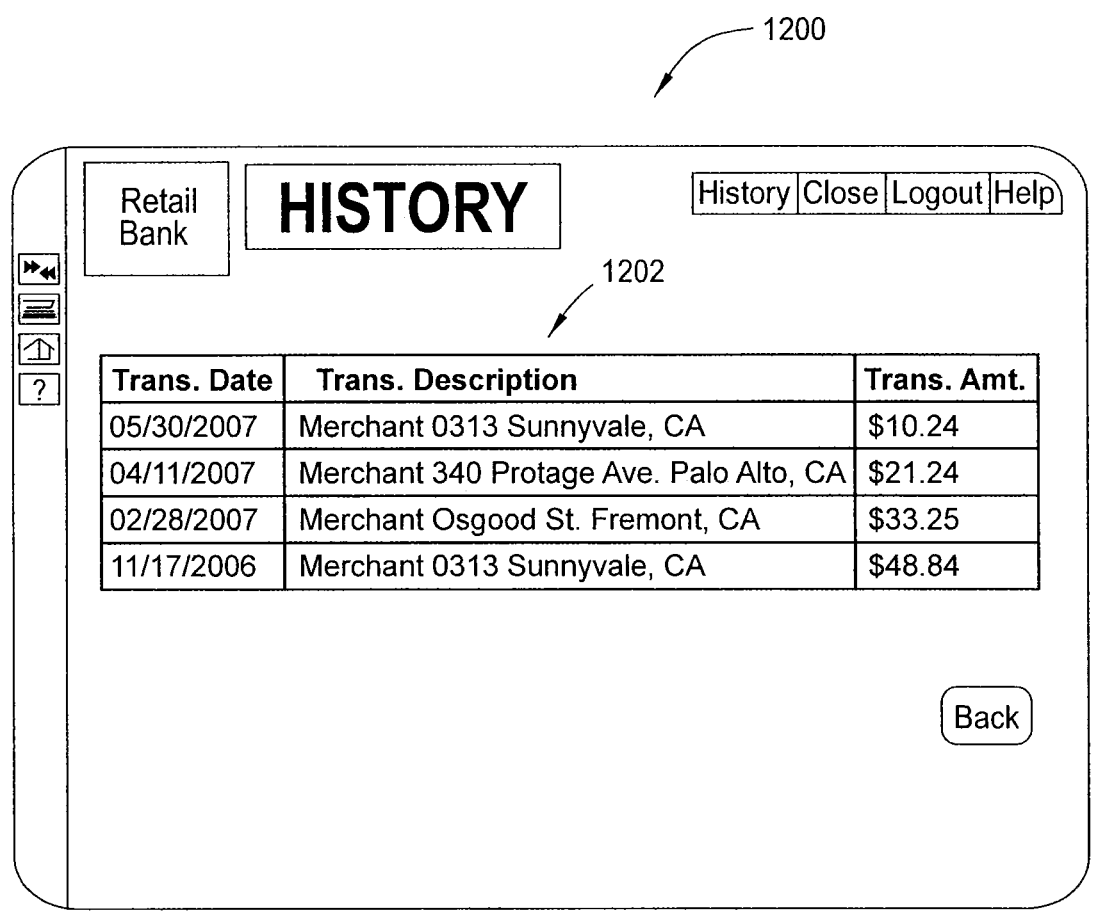
FIG. 12 is a screen shot illustrating a transaction history for a child product, according to one embodiment of the invention.

FIG. 12 is a screen shot 1200 illustrating a transaction history for a child product, according to one embodiment of the invention. As shown, the transaction history 1202 may be a listing of each transaction made using the child product that includes transaction date, transaction description, and transaction amount. Persons having ordinary skill in the art will appreciate that other transaction details may also be displayed, including transaction time, transaction status, etc.

As described above, in one embodiment, a transaction history may be viewable by the purchaser of a child product that enables the parental control option 1106 when generating the child product being used by some one else. In addition, in yet another embodiment, a recipient of a child product (purchased by someone else) can view the transaction history associated to the child card, but cannot view other information related to the purchaser's transactions.

Referring back to FIG. 3A, at step 306, a core account is selected from which to generate a child product. In one embodiment, the core account may be any type of financial account held with a financial institution. For example, the core account may be a checking, savings, home equity, credit card account, or the like. When a child product is generated from a core account, any transactions made using the child product are processed as though the transaction was made using the core account, as is described in greater detail below.

Figure 7A:
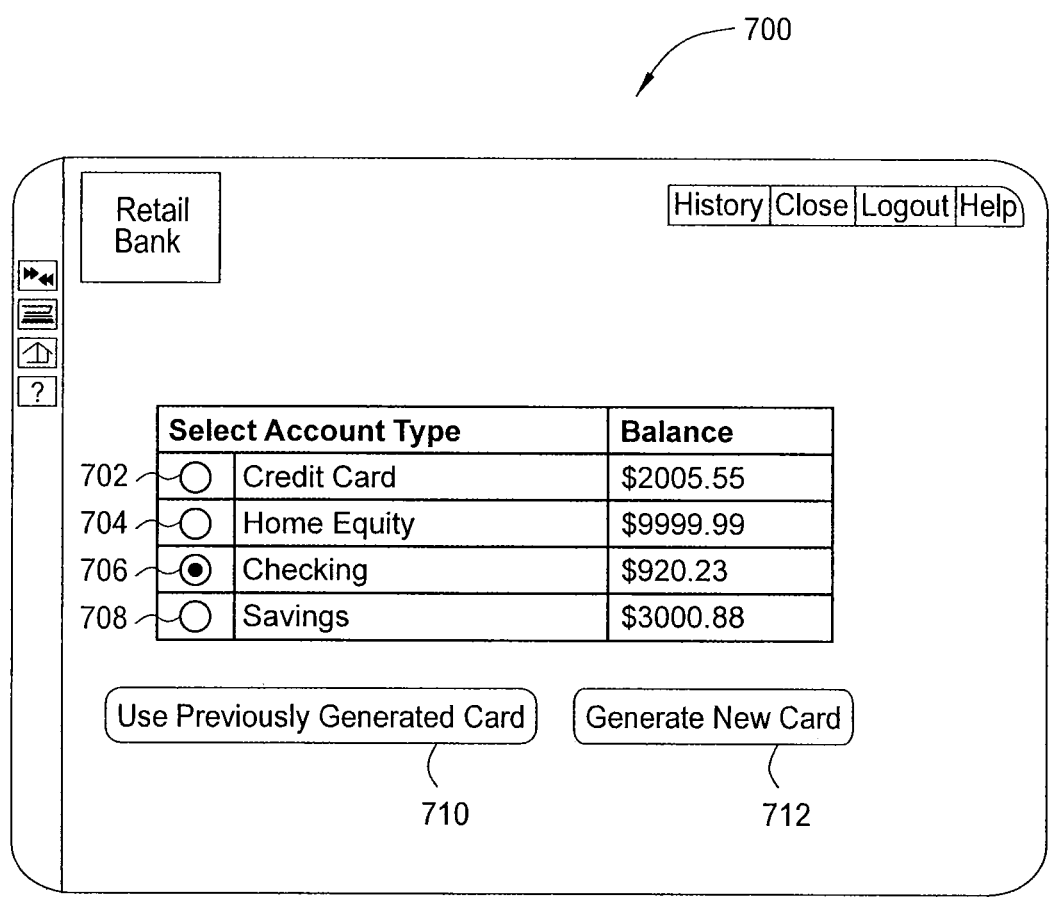
FIG. 7A is a screen shot illustrating selection of a core account, according to one embodiment of the invention.

FIG. 7A is a screen shot 700 illustrating selection of a core account, according to one embodiment of the invention. As shown, the user may select an account held with the financial institution, including a credit card account 702, a home equity account 704, a checking account 706, or a savings account 708. Once a selection has been made, the user may select a "Generate New Card" option to generate a new child product. Alternatively, the user may choose to use one of the previously generated child products.

Figure 7B:
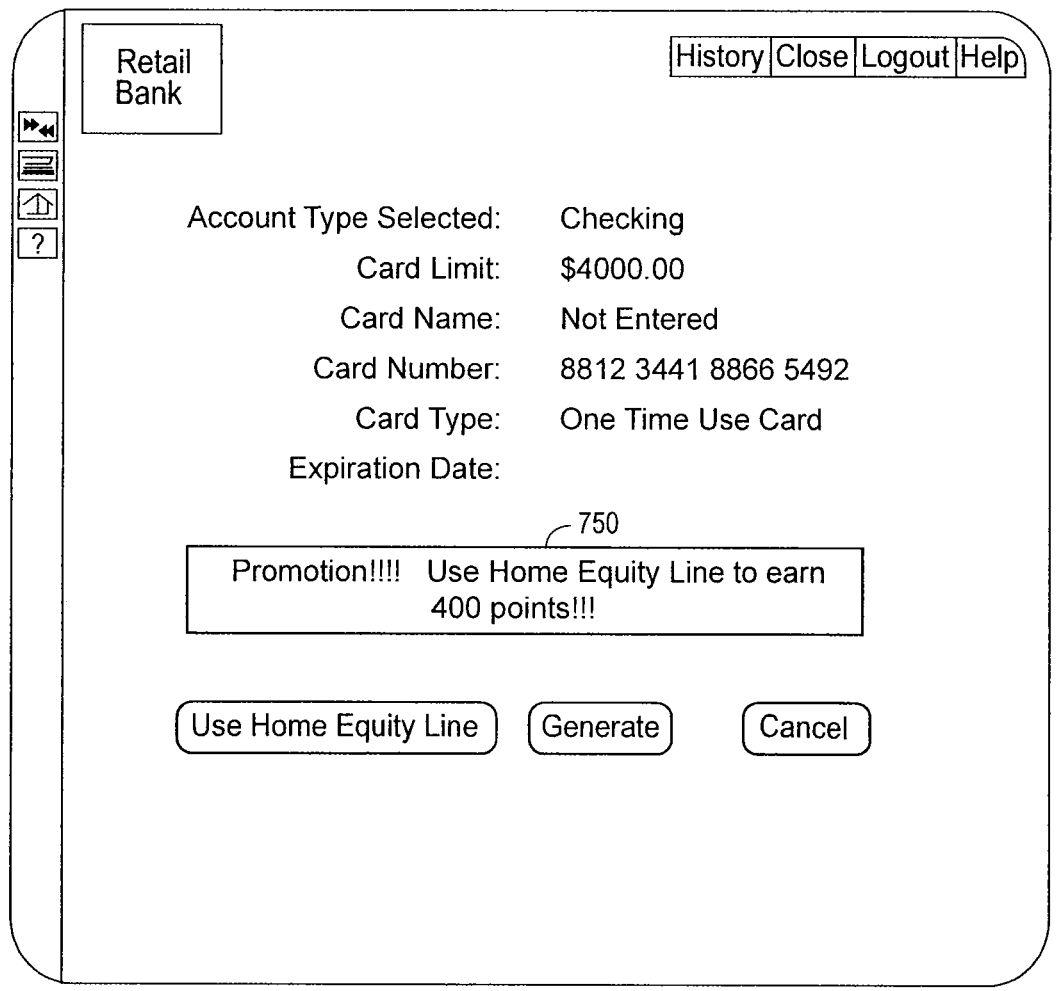
FIG. 7B is a screen shot illustrating selection of a core account and promotion, according to one embodiment of the invention.

Referring now to FIG. 7B, after the user has selected a core account from which to generate the child product, the payment processing platform 110 may offer the user a promotion 750 if the user chooses a different core account. For example, as shown in FIG. 7B, the user may be offered a point earning opportunity if the user chooses to use a home equity line of credit as the core account to which the child product is linked.

Referring back to FIG. 3A, at step 308 a child product is generated. In one embodiment, the child product is generated having a 16-digit card number, a card identification value, an expiration date, and a name on card. As is known, a card number includes a Bank Identification Number or BIN number. The BIN number is generally a one- to six-digit number that identifies the financial institution that issued the credit/debit card. In one embodiment of the invention, the child product generated at step 308 includes a BIN number that identifies that the child product was issued by the payment processing platform 110. In alternative embodiments, the generated child card may include a BIN number within a range that identifies that the child product is associated with a particular financial institution, but is nevertheless a child product. In still further embodiments, depending on the category of the selected core account, the financial institution may request that the payment processing platform issue a child product of a particular type. For example, if the user selects a credit card account as the core account, then the generated child product may include a BIN number that identifies that child card as being a credit card that is processed through a particular credit card network.

Figure 13:
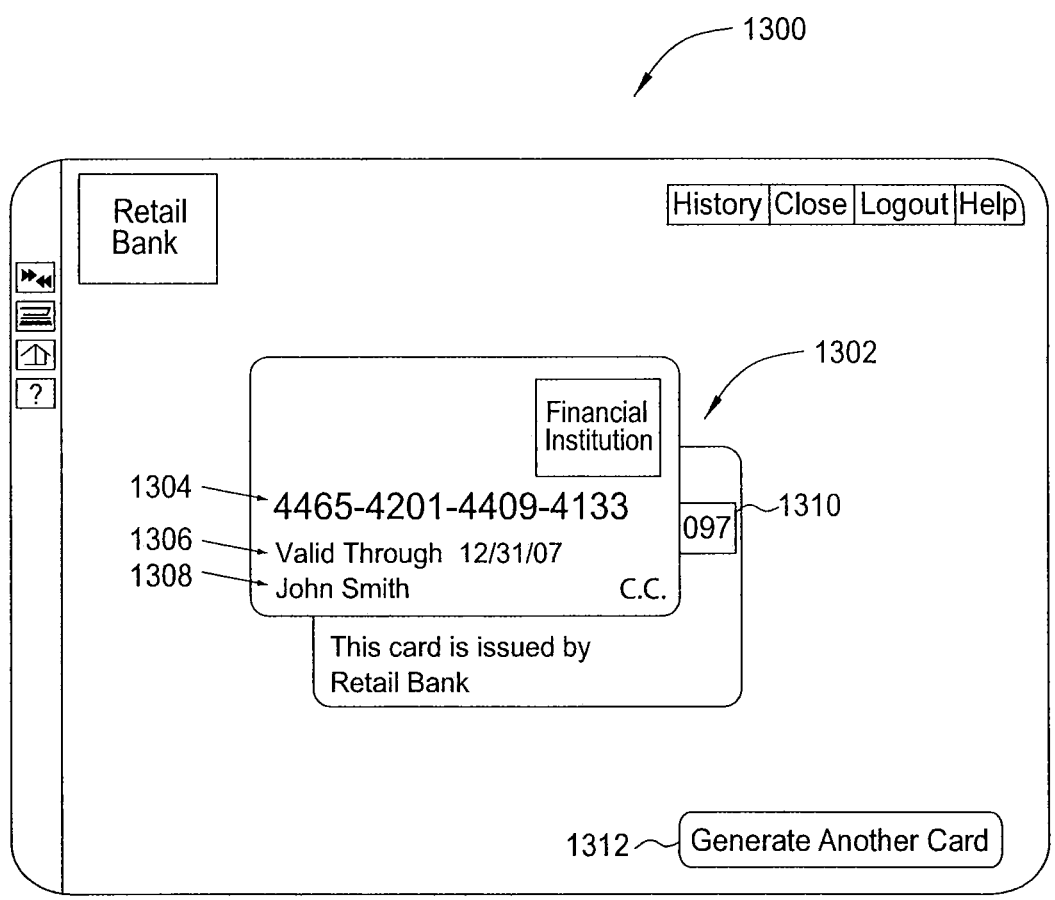
FIG. 13 is a screen shot illustrating a generated child product, according to one embodiment of the invention.

FIG. 13 is a screen shot 1300 illustrating a generated child product 1302, according to one embodiment of the invention. As shown, the child product 1302 includes a card number 1304, expiration date 1306, name 1308, and card identification value 1310. As described above, a physical card may be requested and mailed to the address input when generating the child product 1302. Alternatively, the child product 1302 may be delivered electronically as a virtual card. Alternatively, the product 1302 may be delivered both physically and electronically. The child product can be used at physical merchant or at a card-not-present merchant such as online merchants, or mail-order telephone orders (MOTO) merchants, or any other place where a card is accepted as a payment instrument. In one embodiment, a virtual card may be generated and the card number may be associated with the contactless mobile payment solution such as a radio-frequency identification (RFID) tag of a mobile device to allow a user to make contactless payments at a point-of-sale location. In further embodiments, a virtual card may be generated and the user may print-out an image of the virtual card child product, optionally including other identifying information such as a bar code, and take the print-out to a merchant location as a form of payment. In one embodiment, the card identification value is a Card Verification Value, like CVV, CVV2, PIN number, or any other card identification value.

Figure 14:
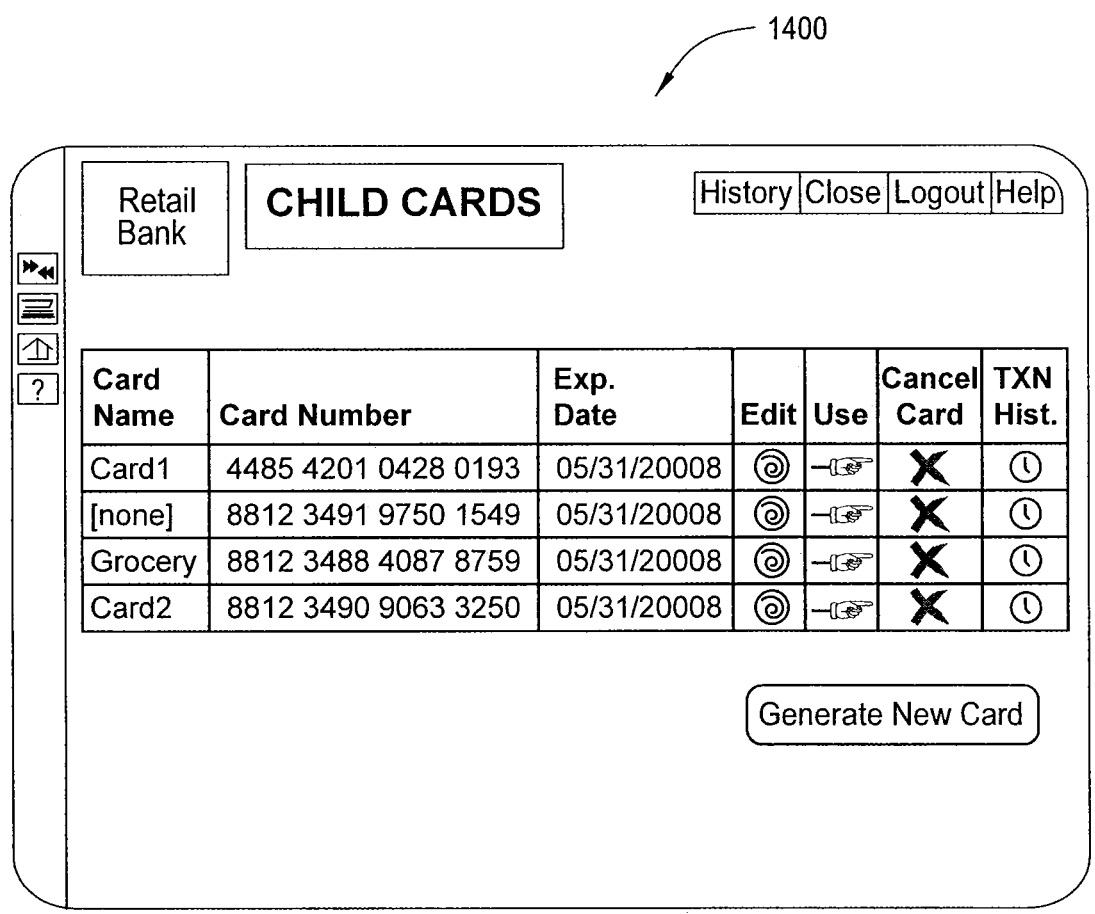
FIG. 14 is a screen shot illustrating a card generation history, according to one embodiment of the invention.

FIG. 14 is a screen shot 1400 illustrating a card generation history, according to one embodiment of the invention. As shown, the user has generated four cards. The user can view a card number and expiration date for each card. Also, the user is offered selections to edit, cancel or use the card, and to view a transaction history for each card. In one embodiment, the ability for a user to edit, use, view transaction history, and cancel a child product is based on the status of the card and a card type. In one embodiment, if the child product was never used and has expired, then none of the options may be available. In additional embodiments, if the child product has never been used, but has not yet expired, then each of the options may be available, except for transaction history. In further embodiments, if the child product is a one-time use card and has been used at least once, the transaction history may be viewed, but the user cannot edit, use, or cancel the child product. In still further embodiments, if the child product is a reusable child product that has been used at least once and is not expired, then each of the options may be available except the edit option. In yet further embodiments, if the child product is a reusable child product that has been used at least once, but has expired, then the transaction history may be viewable by the user, but each of the other options is disabled. As one having ordinary skill in the art will appreciate, many other logic configurations are available for options to be available for use or view by a user.

Referring back to FIG. 3A, at step 310 the child product is delivered. In one embodiment, the child product may be a physical card that may be mailed to the purchaser or to the recipient. In alternative embodiments, the child product may be a virtual card that is available to the purchaser through a web browser. Alternatively, the child product may be a virtual card that is emailed to the recipient, sent using a SMS, sent using any electronics medium or delivered over the phone. As described above, both the physical and the virtual card may be used at physical point of sale merchants as well as for card-not-present transactions, such as online transactions, MOTO transactions, among others.

Figure 15:
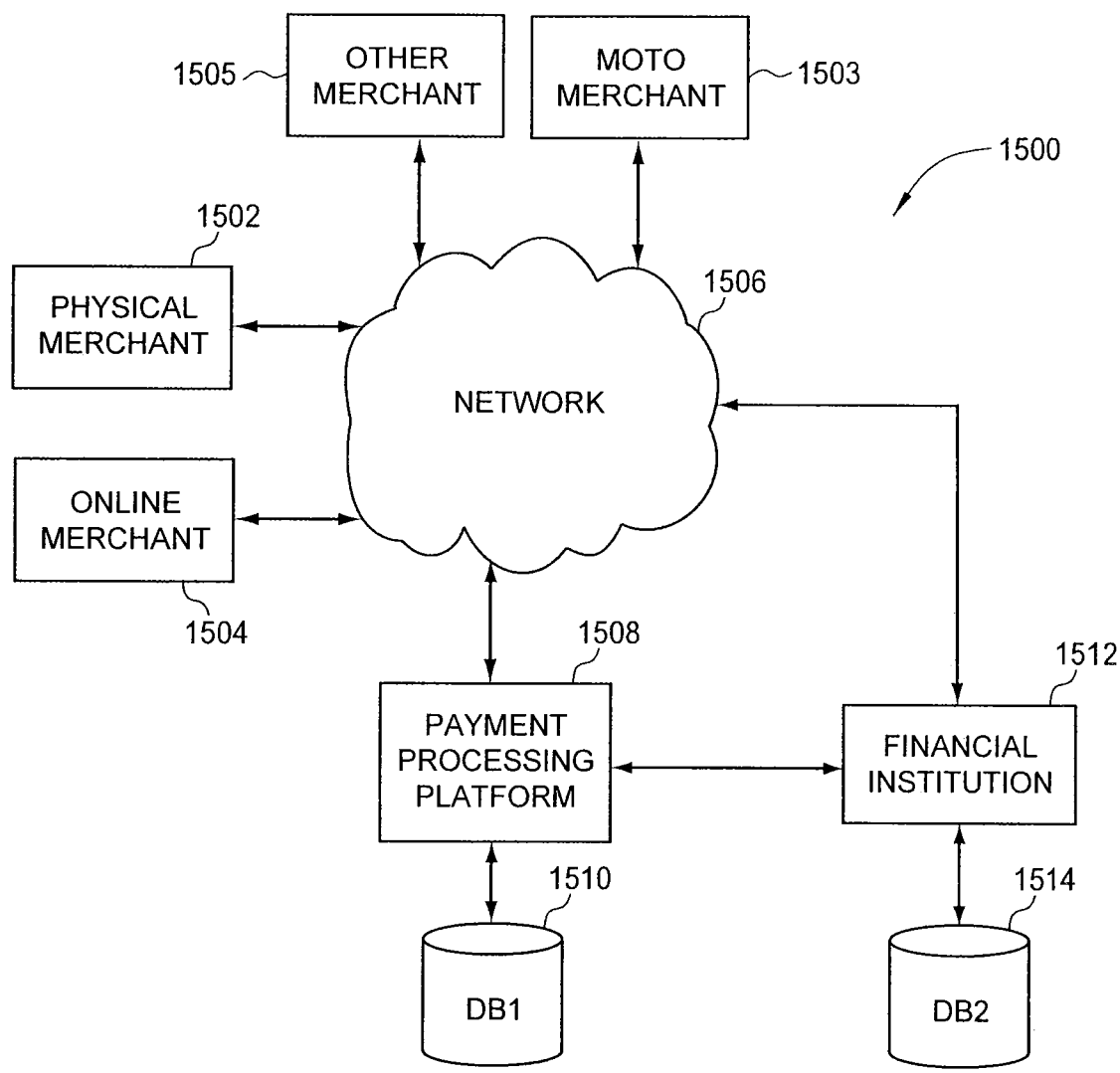
FIG. 15 is a block diagram illustrating components of a system configured to process a child transaction at a physical merchant and to process a core account transaction at the financial institution, or a card not present merchant such as an online merchant, or a mail order merchant, or a telephone order merchant, or any other type of merchant that accepts card payments according to embodiments of the invention.

FIG. 15 is a block diagram illustrating components of a system 1500 configured to process a child transaction and a core account transaction, according to embodiments of the invention. As shown, the system 1500 includes the physical merchant 1502, Mail Order Telephone Order (MOTO) merchant 1503, online merchant 1504, other merchant 1505, a network 1506, a payment processing platform 1508, a first database 1510, a financial institution 1512, and a second database 1514.

In one embodiment, a transaction initiated with a child product is known as a "child transaction." As described above, a child product may be delivered in the form of a physical card mailed to a purchaser or to a recipient. Alternatively, the child product may be delivered electronically as a virtual card. Alternatively, the child product may be delivered both physically and electronically as a physical and a virtual card. Both the physical card child product and the virtual child card product may be used at any physical merchant 1502, MOTO merchant 1503, online merchant 1504 or other merchant 1505 that accepts regular credit/debit cards.

A child transaction may be initiated at the physical merchant 1502. For example, a cashier at the physical merchant 1502 may swipe the physical child product through a card reader. Alternatively, a child product may be delivered virtually on a user's mobile device and a user at the physical merchant 1502 may wave his/her mobile device in front of a contact-less card reader.

In one embodiment, the network 1506 is a card network. In alternative embodiments, the network 1506 is an electronic funds transfer (EFT) network or a private network. In one embodiment, the child product may be a credit card child product, in which case child transaction information is sent to the appropriate credit card network. Similarly, the child product may be a signature debit card child product, in which case the child transaction information is sent to the appropriate debit card network. In other embodiments, the child product may be a PIN debit card in which case the child transaction information is sent to the appropriate EFT network. Additionally, the child product may be a special card in which case the child transaction information is sent to the appropriate private network.

In one embodiment, when a child transaction is received by the network 1506 and identified as having a BIN number range associated with the payment processing platform 1508 that issued the child product, then the child transaction is routed to the payment processing platform 1508. In another embodiment, when a child transaction is received by the network 1506 and identified as having a special BIN number range associated with a financial institution of the core account, then the child transaction is routed to the payment processing platform 1508.

When a child transaction is received by the payment processing platform 1508, the payment processing platform 1508 may then compare the child transaction details with control parameters stored for that particular child product in the first database 1510. As described above, the comparison may require that each control parameter stored for the child product is satisfied, that a minimum number of control parameters are satisfied, or that a sum of the weights assigned to control parameters that are satisfied exceeds a minimum threshold. In one embodiment, if at least one of the control parameters is not satisfied, then the payment processing platform may return a decline response to the network 1506 and the child transaction is denied. If each of the control parameters is satisfied, then the card number of the child product is linked to the "real" account number of the core account to which the child product is linked. In one embodiment, the second database 1514 contains the mapping from child product card numbers to core account numbers, and may be located on the systems of the financial institution 1512. In alternative embodiments, the second database 1514 may reside on systems operated by the payment processing platform 1508. Once the core account number is determined, a core account transaction is generated and is transmitted to the network 1506 for normal routing and processing as a core account transaction. The core account transaction is sent to the financial institution that issued the core account. The processing system at the financial institution that issued the core account processes the core account transaction in normal fashion and approves or denies the transaction based on a normal set of processing rules.

A similar child transaction may be initiated from an online merchant 1504, from a MOTO merchant 1503, or from any other merchant 1505. In one embodiment, the user may input the child product card number into a payment webpage and an online child transaction is initiated. In another embodiment, the user may submit the child product card number to a customer service representative at a MOTO merchant 1503. In yet another embodiment, the user may submit the child product card number in a mail order form to a MOTO merchant 1503. A child transaction initiated at a MOTO merchant 1503, at an online merchant 1504, or at any other merchant 1505 may be processed in similar fashion to a child transaction initiated at the physical merchant location 1502.

Figure 16:
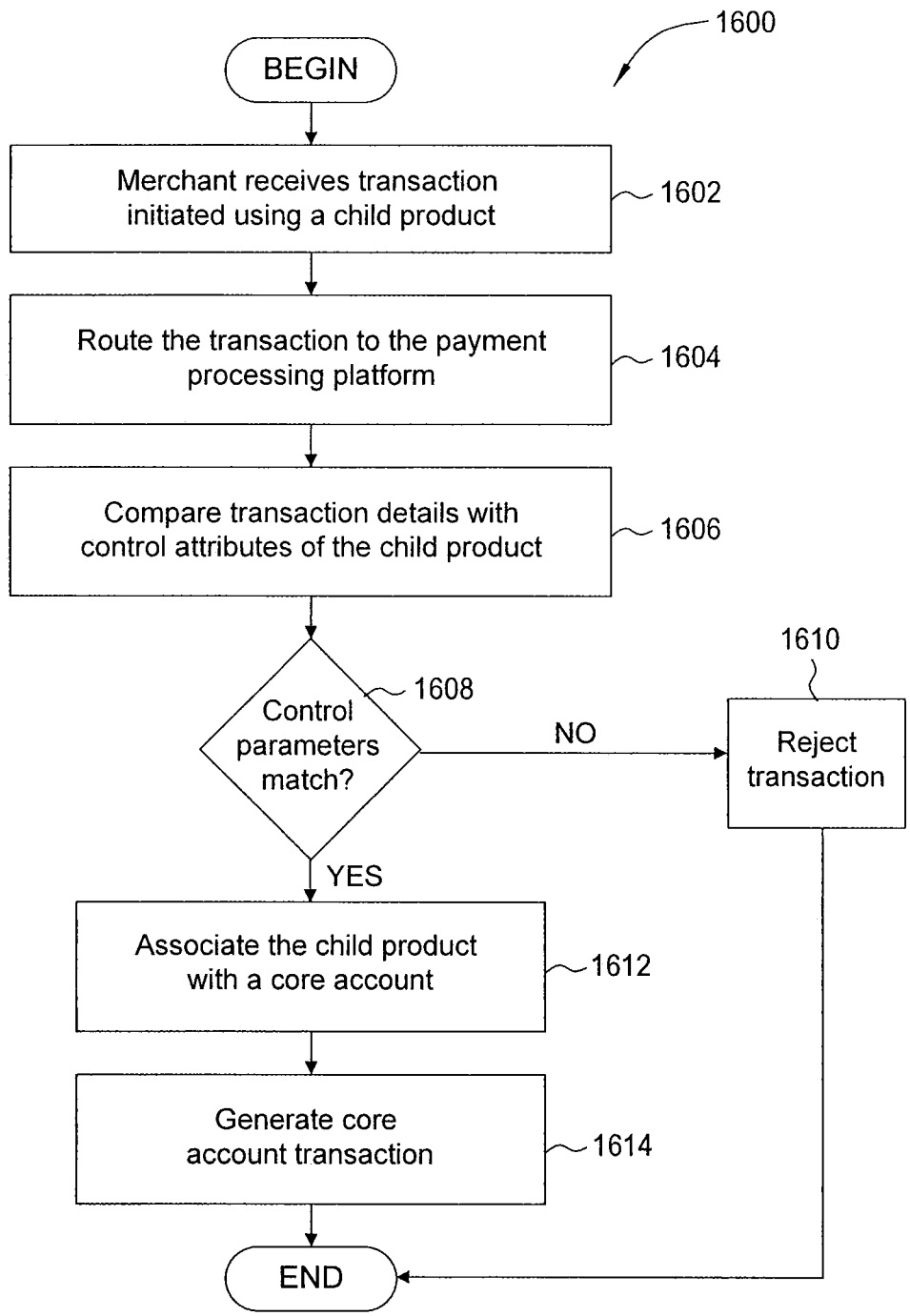
FIG. 16 is a flow diagram of method steps for processing a child transaction and a core account transaction, according to one embodiment of the invention.

FIG. 16 is a flow diagram of method steps for processing a child transaction and a core account transaction, according to one embodiment of the invention. Persons skilled in the art will understand that, even though the method is described in conjunction with the systems of FIGS. 1, 2, and 15 any system configured to perform the steps of the method 1600 illustrated in FIG. 16, in any order, is within the scope of the present invention.

As shown, the method 1600 begins at step 1602 where a merchant receives a child transaction initiated using a child product. In one embodiment, the merchant is a physical merchant and the child transaction is initiated by the child product (physical card) being swiped through a credit card reader or virtual card waved in front of a contactless card reader or virtual card read by a bar code reader, or merchant reading a card number from device or a print out. In alternative embodiments, the merchant is an online merchant, MOTO merchant, or other merchant receives a child product card number that is input into a payment webpage of the online merchant website, over the phone, via a mail-order, or via any other means.

At step 1604, the child transaction is routed to the payment processing platform that generated the child product. As described above, a child product includes a BIN number range that identifies it being a child product. In one embodiment, the child transaction is passed directly to the payment processing platform, bypassing the network. In alternative embodiments, the child transaction is passed to a network. As described, the child product may be a credit card in which case the child transaction information is sent to the appropriate credit card network. Alternatively, the child product may be a signature debit card in which case the child transaction information is sent to the appropriate debit card network. The child product may be a PIN debit card in which case the child transaction information is sent to the appropriate EFT network. The child product may be a special card in which case the child transaction information is sent to the appropriate private network. In yet further embodiments, the child transaction is processed through multiple networks before ultimately being routed to the payment processing platform. To the merchant, the child transaction may proceed as though the payment processing platform is the "issuer" of the child product with which the child transaction is initiated.

At step 1606, the payment processing platform compares the child transaction details with control parameters of the child product. As described above, each child product is associated with a series of control parameters that are stored in a first database DB1, referenced by child product. When the child transaction is received by the payment processing platform, the child product card number may be used as a reference pointer to determine the associated control parameters stored in the first database DB1.

At step 1608, if the control parameters of the child transaction do not match the control parameters stored in the first database DB1, then the child transaction is rejected, a denial is returned at step 1610, and the method 1600 terminates. In one embodiment, if the child transaction was routed from the merchant to the payment processing platform bypassing the network, then the denial is returned directly to the merchant. In alternative embodiments, if the child transaction was routed through a network to the payment processing platform, then the denial is returned to the network and routed to the merchant.

As described above, the determination of whether the control parameters match at step 1608 may require that each control parameter stored for the child product is satisfied, that a minimum number of control parameters are satisfied, or that a sum of the weights assigned to control parameters that are satisfied exceeds a minimum value. If at step 1608 the control parameters match, then the method 1600 proceeds to step 1612.

At step 1612, the child product is associated with a core account. As described above, a second database DB2 stores a mapping of the child product to the core account to which the child product is linked. In one embodiment, the second database DB2 resides on the financial institution system. In alternative embodiments, the second database DB2 resides within the payment processing platform system.

At step 1614, a core account transaction is generated with the core account number and other child transaction details. In one embodiment, generating the core account transaction is based on the core account number. In one embodiment, the core account transaction is transmitted to the network for normal processing. For example, the financial institution that receives the core account transaction may view the core account transaction with the payment processing platform as being the "merchant" from which the transaction was initiated. In alternative embodiments, the core account transaction is transmitted directly to the financial institution from the payment processing platform, bypassing the network.

In one embodiment, when the core account transaction is received at the financial institution, the financial institution views the core account transaction as initiating from the payment processing platform as a merchant entity. Thus, the financial institution processes the core account transaction and transfers funds to the payment processing platform, which in turn transfers the funds to the original merchant. In alternative embodiments, the financial institution that receives the core account transaction can determine the original merchant is the payee, and the funds are transferred to the merchant, bypassing the payment processing platform. In this manner, a two-part transaction is completed. The child transaction, as described at step 1602-1606, is processed as though the payment processing platform is the "issuer" of the child product. Then, the core account transaction, as described at steps 1612-1614, is processed by the financial institution as though the payment processing platform is the "merchant" that initiated the core account transaction.

One advantage of the systems and methods disclosed herein is that when processing a child transaction, the financial institution needs to modify its legacy payment processing infrastructure minimally. Financial institutions would prefer using a child product system over prior art payment processing systems because the child products could be bank-branded and the payment processing platform is transparent to the user. Additionally, because child products have a similar format as conventional cards, physical merchants, online merchants, MOTO merchants, and other merchants need to modify their systems minimally in order to accept payment from a child product.

Additional advantages of the systems and methods disclosed herein may be realized from a user perspective. For example, for a one time use child card, if the card number is stolen, then the child product has no value apart from a single transaction. Other advantages for consumers include protection from fraud or identity theft, and limited exposure when cards are lost or stolen. For example, a user that is going on a two-week vacation to another country may wish to generate a child product with control parameters of specific country of use, activation date as the first day of the vacation, expiration date as the final day of the vacation, limit of $100.00 per transaction, and a limit of $2000.00 for the card. If the child product is lost or stolen, or if the card number is compromised, then the user is only exposed for the amounts set by the control parameters. Additionally, the user does not need to close the original core account to which the child product is linked, as that information was never exposed or stolen.

While the forgoing is directed to embodiments of the present invention, other and further embodiments of the invention may be devised without departing from the basic scope thereof. For example, aspects of the present invention may be implemented in hardware or software or in a combination of hardware and software. In addition, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A computer-implemented method for processing a child transaction initiated using a child product, the method comprising:
receiving, at a payment processing platform that is separate and distinct from a financial institution entity, the child transaction involving the child product, wherein:
the child product was generated at the payment processing platform in response to a user input and based on a core account that provides financial backing for the child product and is managed by the financial institution entity, and
the child product includes:
two or more control parameters corresponding to the user input and specifying a restriction on a transaction attribute, each of the two or more control parameters associated with a different weight value specified by an owner of the core account, and
a virtual card available through a web browser, the virtual card including a child card number, and
the child transaction is initiated at an online merchant entity via a merchant website, is routed to the payment processing platform through a network based on the child card number, and includes one or more transaction attributes that define the child transaction;
comparing the one or more transaction attributes to the two or more control parameters to determine whether to restrict approval of the child transaction by:
implementing the child card number as a reference pointer to identify the two or more control parameters stored to a first database, for each transaction attribute, applying the weight value associated with one of the two or more control parameter that is satisfied by the transaction attribute, and
determining that a sum of the weight values exceeds a threshold value; and
in response to determining that the child transaction is valid:
identifying, based on the child card number, a core account number associated with the core account, and
generating, at the payment processing platform, a core account transaction based on the core account number,
wherein the core account transaction includes information specific to the core account and is processed by the financial institution entity, and a result of the child transaction is based on a result that is generated when the core account transaction is processed.

2. The method of claim 1, wherein the financial institution entity processes the core account transaction while viewing the payment processing platform as a second merchant entity.

3. The method of claim 1, wherein:
the steps of comparing, identifying, and generating are performed by a payment processing platform, and the online merchant entity views the payment processing platform as an issuer of the child product.

4. The method of claim 1, wherein a mapping of the child card number to the core account number is stored in a second database.

5. The method of claim 4, wherein the first database resides at a payment processing platform system, and wherein the second database resides at a financial institution system.

6. The method of claim 4, wherein the first database and the second database reside at the same system.

7. The method of claim 1, wherein the network is one of a credit card network, a debit card network, an electronic funds transfer (EFT) network, or a private network.

8. The method of claim 1, further comprising:
authenticating a user as the owner of the core account.

9. The method of claim 8, wherein authenticating the user as the owner of the core account further comprises:
comparing a device profile of a user device, used for authenticating the user as the owner of the core account, with data stored in a device fingerprint authentication server.

10. The method of claim 1, wherein the core account is one of a checking account, savings account, home equity account, healthcare savings account, educational savings account, or credit card account.

11. The method of claim 1, wherein a first control parameter included in the two or more control parameters comprises one of a limit on an amount for the child transaction, a limit on a number of transactions made using the child product during a period of time, an activation date, an expiration date, a country of use parameter, a merchant parameter, a merchant category parameter, a time of day parameter, a day of week parameter, a date of month parameter, a reset frequency parameter, or a channel parameter.

12. The method of claim 1, wherein a first control parameter included in the two or more control parameters comprises a parental control allowing a user to view transaction details for transactions made by another using the child product.

13. The method of claim 1, wherein a portion of credit available in the core account is allocated for use by a recipient of the child product.

14. One or more non-transitory computer-readable media storing instructions that, when executed by a processor at a payment processing entity, cause the payment processing entity to process a child transaction initiated using a child product by performing the steps of:
receiving, at the payment processing entity that is separate and distinct from a financial institution entity, the child transaction involving the child product, wherein:
the child product was generated at the payment processing entity in response to a user input and based on a core account that provides financial backing for the child product and is managed by the financial institution entity, and
the child product includes:
two or more control parameters corresponding to the user input and specifying a restriction on a transaction attribute, each of the two or more control parameters associated with a different weight value specified by an owner of the core account, and
a virtual card available through a web browser, the virtual card including a child card number, and
the child transaction is initiated at an online merchant entity via a merchant website, is routed to the payment processing entity through a network based on the child card number, and includes one or more transaction attributes that define the child transaction;
comparing the one or more transaction attributes to the two or more control parameters to determine whether to restrict approval of the child transaction by:
implementing the child card number as a reference pointer to identify the two or more control parameters stored to a first database,
for each transaction attribute, applying the weight value associated with one of the two or more control parameter that is satisfied by the transaction attribute, and
determining that a sum of the weight values exceeds a threshold value; and in response to determining that the child transaction is valid:
identifying, based on the child card number, a core account number associated with the core account, and
generating, at the payment processing entity, a core account transaction based on the core account number,
wherein the core account transaction includes information specific to the core account and is processed by the financial institution entity, and a result of the child transaction is based on a result that is generated when the core account transaction is processed.

15. The one or more non-transitory computer-readable media of claim 14, wherein:
the steps of comparing, identifying, and generating are performed by a payment processing platform within the payment processing entity, and the online merchant entity views the payment processing platform as an issuer of the child product.

16. The one or more non-transitory computer-readable media of claim 14, wherein a mapping of the child card number to the core account number is stored in a second database.

17. The one or more non-transitory computer-readable media of claim 16, wherein:
the first database resides at a payment processing platform system that includes the payment processing entity, and
the second database resides at a financial institution system that includes the financial institution entity.

18. The one or more non-transitory computer-readable media of claim 16, wherein the first database and the second database reside at the same system.

19. The one or more non-transitory computer-readable media of claim 14, wherein the core account is one of a checking account, a savings account, a home equity account, a healthcare savings account, an educational savings account or a credit card account.

20. The one or more non-transitory computer-readable media of claim 14, wherein a first control parameter included in the two or more control parameters comprises one of a limit on an amount for the child transaction, a limit on a number of transactions made using the child product during a period of time, an activation date, an expiration date, a country of use parameter, a merchant parameter, a merchant category parameter, a time of day parameter, a day of week parameter, a date of month parameter, a reset frequency parameter, or a channel parameter.

21. The one or more non-transitory computer-readable media of claim 14, wherein a first control parameter included in the two or more control parameters comprises a parental control allowing a user to view transaction details for transactions made by another using the child product.

22. The one or more non-transitory computer-readable media of claim 14, wherein a portion of credit available in the core account is allocated for use by a recipient of the child product.

* * * * *